United States Patent
Noh et al.

(10) Patent No.: US 8,630,160 B2
(45) Date of Patent: *Jan. 14, 2014

(54) METHOD FOR UPLINK TRANSMISSION IN OFDM(A) SYSTEM

(75) Inventors: Min Seok Noh, Anyang-si (KR); Yeong Hyeong Kwon, Anyang-si (KR); Sung Ho Moon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR); Jin Soo Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 190 days.

This patent is subject to a terminal disclaimer.

(21) Appl. No.: 12/985,246

(22) Filed: Jan. 5, 2011

(65) Prior Publication Data

US 2011/0200030 A1    Aug. 18, 2011

Related U.S. Application Data

(63) Continuation of application No. 12/388,250, filed on Feb. 18, 2009, now Pat. No. 7,889,633.

(60) Provisional application No. 61/029,574, filed on Feb. 19, 2008, provisional application No. 61/095,608, filed on Sep. 9, 2008.

(30) Foreign Application Priority Data

May 13, 2008  (KR) .................. 10-2008-0044045
Feb. 17, 2009  (KR) .................. 10-2009-0012948

(51) Int. Cl.
*H04J 11/00*    (2006.01)

(52) U.S. Cl.
USPC .......................................................... 370/208

(58) Field of Classification Search
CPC ..................................................... H04L 5/0007
USPC ................... 370/208, 329, 344, 206; 375/260
See application file for complete search history.

(56) References Cited

U.S. PATENT DOCUMENTS 6,430,724 B1    8/2002  Laneman et al.
6,795,424 B1    9/2004  Kapoor et al.
(Continued)

FOREIGN PATENT DOCUMENTS

CN    1703037 A       11/2005
JP    2005-341056 A   12/2005
(Continued)

OTHER PUBLICATIONS

IEEE Standard 802.16e-2005, Feb. 28, 2006, pp. 1-864.*

(Continued)

*Primary Examiner* — Steven H Nguyen
*Assistant Examiner* — Phuongchau B Nguyen
(74) *Attorney, Agent, or Firm* — Birch, Stewart, Kolasch & Birch, LLP

(57) ABSTRACT

A method for uplink transmission in an OFDMA system is provided. The subcarrier transmission method includes arranging 4 pilot REs at different positions of a frequency axis in a basic unit when the basic unit includes 4 subcarriers on the frequency axis and 6 OFDM(A) symbols in a time axis, arranging data REs at remaining positions of the basic unit, and transmitting the basic unit to a receiving end.

13 Claims, 24 Drawing Sheets

Allocation in units of 4 subcarrier ✕ 6 OFDM(A) symbols

(56) References Cited

U.S. PATENT DOCUMENTS

| | | | |
|---|---|---|---|
| 7,573,806 B2* | 8/2009 | Ihm et al. ............... | 370/208 |
| 7,646,700 B2* | 1/2010 | Wang et al. ............. | 370/203 |
| 7,889,633 B2* | 2/2011 | Noh et al. ............... | 370/208 |
| 8,040,789 B2* | 10/2011 | Noh et al. ............... | 370/208 |
| 2005/0135324 A1* | 6/2005 | Kim et al. ............... | 370/343 |
| 2005/0265226 A1 | 12/2005 | Shen et al. | |
| 2005/0265479 A1 | 12/2005 | Fujii et al. | |
| 2005/0286408 A1* | 12/2005 | Jin et al. ............... | 370/208 |
| 2007/0014254 A1* | 1/2007 | Chung et al. ............ | 370/318 |
| 2007/0173198 A1 | 7/2007 | Kim et al. | |
| 2007/0223440 A1 | 9/2007 | Ho et al. | |
| 2008/0039030 A1* | 2/2008 | Khan et al. ............. | 455/101 |
| 2008/0075185 A1 | 3/2008 | Park et al. | |
| 2009/0003466 A1 | 1/2009 | Taherzadehboroujeni et al. ............... | 375/260 |
| 2009/0003479 A1 | 1/2009 | Kim et al. | |
| 2009/0196367 A1 | 8/2009 | Kim et al. | |
| 2009/0213723 A1 | 8/2009 | Noh et al. | |
| 2009/0257520 A1* | 10/2009 | Lin et al. ............... | 375/260 |
| 2009/0262848 A1* | 10/2009 | Choi et al. ............. | 375/260 |
| 2009/0285168 A1 | 11/2009 | Choi et al. | |
| 2010/0002787 A1 | 1/2010 | Choi et al. | |
| 2010/0020890 A1* | 1/2010 | Choi et al. ............. | 375/260 |
| 2010/0027698 A1 | 2/2010 | Kim et al. | |
| 2010/0110874 A1 | 5/2010 | Kang et al. | |
| 2010/0118991 A1 | 5/2010 | Lee et al. | |
| 2010/0118995 A1 | 5/2010 | Fukui | |
| 2010/0166090 A1 | 7/2010 | Ho | |
| 2010/0202401 A1 | 8/2010 | Hwang et al. | |
| 2010/0254342 A1* | 10/2010 | Cho et al. ............... | 370/330 |
| 2011/0026482 A1* | 2/2011 | Li et al. ............... | 370/329 |

FOREIGN PATENT DOCUMENTS

| | | |
|---|---|---|
| RU | 2285349 C2 | 10/2006 |
| WO | WO 2006/001658 A1 | 1/2006 |

OTHER PUBLICATIONS

IEEE Standard 802.16-2004, Oct. 1, 2004, pp. 1-895.*
Russian Decision on Grant dated Sep. 29, 2011 for corresponding Application No. 2010138596.
Cudak et al., "Proposed 802.16m Frame Structure with special attention to legacy support", IEEE C802.16m-08/008, Jan. 16, 2008, pp. 2-14.
Ihm et al., "Extension of collaborative spatial multiplexing in OFDMA", IEEE C802.16e-04/428r7, Jan. 26, 2005, pp. 0-7.

* cited by examiner

Allocation in units of 4 subcarrier × 3 OFDM(A) symbols

Allocation in units of 4 subcarrier × 6 OFDM(A) symbols

Allocation in units of 4 subcarrier × 6 OFDM(A) symbols

Allocation in units of 4 subcarrier × 3 OFDM(A) symbols

Allocation in units of 4 subcarrier × 6 OFDM(A) symbols

Allocation in units of 4 subcarrier × 6 OFDM(A) symbols

Allocation in units of 4 subcarrier × 3 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 6 OFDM(A) symbols

Allocation in units of 4 subcarrier × 9 OFDM(A) symbols

Allocation in units of 4 subcarrier × 9 OFDM(A) symbols

Allocation in units of 4 subcarrier × 9 OFDM(A) symbols

Allocation in units of 4 subcarrier × 9 OFDM(A) symbols

METHOD FOR UPLINK TRANSMISSION IN OFDM(A) SYSTEM

This application is a Continuation of application Ser. No. 12/388,250, filed Feb. 18, 2009, now U.S. Pat. No. 7,889,633 and claims the benefit of U.S. provisional application 61/029,574, filed on Feb. 19, 2008, Korean Patent Application No. 10-2008-0044045, filed on May 13, 2008, U.S. provisional application 61/095,608, filed on Sep. 9, 2008, and Korean Patent Application No. 10-2009-0012948, filed on Feb. 17, 2009, which are hereby incorporated by reference in their entirety.

BACKGROUND OF THE INVENTION

1. Field of the Invention

The present invention relates to a wireless communication system, and more particularly, to a method for uplink transmission in an OFDM(A) wireless communication system.

2. Discussion of the Related Art

A current IEEE 802.16e system uses a tile and pilot structure as shown in FIG. 1 as an uplink Partial Usage of Sub-Channel (PUSC) structure. One transmit antenna is considered in the structure of FIG. 1. This uplink PUSC basic unit structure has a pilot overhead of 33.33%. In FIG. 1, the pilot and data subcarriers refer to resource elements (REs) allocated for pilot and data respectively. Each RE represents a time-frequency resource defined by one OFDM(A) symbol and one subcarrier. In the following description, the terms "pilot subcarrier" and "data subcarrier" can be interchanged with the terms "pilot RE" and "data RE" respectively.

Since only one transmit antenna is considered in the uplink tile structure used in the current IEEE 802.16e system, the uplink PUSC basic unit structure has a pilot overhead of 33.33%. Thus, the ratio of pilot overhead to data is significant. Such pilot overhead reduces link throughput, causing a reduction in system performance. When an extended basic unit is employed as in IEEE 802.16m, one issue is to reduce pilot overhead.

SUMMARY OF THE INVENTION

Accordingly, the present invention is directed to a method for uplink transmission in an OFDM(A) system that substantially obviates one or more problems due to limitations and disadvantages of the related art.

An object of the present invention is to provide an uplink transmission method which can reduce pilot overhead and guarantee channel estimation performance even when the size of a basic unit for uplink has been extended in a time axis.

Another object of the present invention is to provide an uplink transmission method which guarantees backward compatibility for an IEEE 802.16e system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In legacy IEEE 802.16e system, an uplink PUSC tile contains four contiguous subcarriers by three contiguous OFDM(A) symbols. The legacy IEEE 802.16e system applies permutation to distribute the uplink PUSC tiles within the corresponding frequency band in the procedure of mapping the uplink PUSC tiles to physical subcarriers. In particular, the permutation method configures every three OFDM(A) symbols to have the same logical tile index, whereby the uplink PUSC tiles can be spread within corresponding frequency band.

Such permutation method could be easily modified for an extended tile structure by configuring multiplies of three OFDM(A) symbols, e.g. six, nine or twelve OFDM(A) symbols, which is contiguous in time domain and is within the same physical frequency band to have the same logical tile index. As such, the permutation method of the legacy IEEE 802.16e system could be extended to distribute radio resource in units of multiplies of three OFDM(A) symbols. Therefore it is preferable that IEEE 802.16m system under discussion forms uplink tile with four subcarrier by multiplies of three OFDM(A) symbols in case of supporting the legacy IEEE 802.16e system via frequency division multiplexing (FDM).

In IEEE 802.16m system under discussion, basic frame structure includes a 20 ms superframe supporting 5 MHz, 8.75 MHz 10 MHz, or 20 MHz bandwidth. Each superframe is divided into four equally-sized 5 ms radio frames and begins with the superframe header (SFH). Each 5 ms radio frame further consists of eight subframes. A subframe shall be assigned for either DL or UL transmission. There are three types of subframes depending on the size of cyclic prefix, i.e. subframe consisting of five, six or seven OFDM(A) symbols. The subframe carries smaller resource units with various types/sizes. The basic frame structure is applied to FDD and TDD duplexing schemes.

In one aspect of the present invention, a method of transmitting a basic unit in uplink is provided, the method comprising: arranging 4 pilot REs at different positions of a frequency axis in a basic unit when the basic unit contains 4 subcarriers by 6 or more OFDM(A) symbols; arranging data REs at remaining positions of the basic unit; and transmitting the basic unit to a receiving end. The receiving end includes a base station (BS).

In the step of arranging the 4 pilot REs, the 4 pilot REs may be arranged in pair such that two pilot REs of each pair are arranged at the same position on the time axis.

In the step of arranging the 4 pilot REs, two or more pilot REs among the 4 pilot REs may be arranged at edge positions of the basic unit.

In another aspect of the present invention, a method of transmitting a basic unit in uplink is provided, the method comprising: arranging 4 pilot REs in pairs such that two pilot REs of each pair are arranged at the same position of a frequency axis in a basic unit when the basic unit contains 4 subcarriers by 6 or more OFDM(A) symbols; arranging data REs at remaining positions of the basic unit; and transmitting the basic unit to a receiving end.

In the step of arranging the 4 pilot REs, the 4 pilot REs may be arranged at different positions on the time axis.

In the step of arranging the 4 pilot REs, the 4 pilot REs may be arranged in pairs such that two pilot REs of each pair are arranged at the same position on the time axis.

In the step of arranging the 4 pilot REs, two or more pilot REs among the 4 pilot REs may be arranged at edge positions of the basic unit.

In the step of arranging the 4 pilot REs, two or more pilot REs among the 4 pilot REs may be arranged at non-edge positions of the basic unit.

In another aspect of the present invention, a method of transmitting a basic unit in uplink is provided, the method comprising: arranging 3 pilot REs at different positions on a time axis in a basic unit when the basic unit contains 4 subcarriers by 6 or more OFDM(A) symbols; arranging data REs at remaining positions of the basic unit, and transmitting the basic unit to a receiving end.

In the step of arranging the 3 pilot REs, a pair of pilot REs among the 3 pilot REs may be arranged at the same position on the frequency axis and the remaining pilot RE may be arranged at a position, different from that of the pair of pilot REs, on the frequency axis.

In the step of arranging the 3 pilot REs, the pair of pilot REs and the remaining pilot REs may be arranged at most distant positions on the frequency axis.

In another aspect of the present invention, a method of transmitting a basic unit in uplink is provided, the method comprising: arranging 6 pilot REs over all positions in a frequency axis of a basic unit when the basic unit contains 4 subcarriers by 9 or more OFDM(A) symbols; arranging data REs at remaining positions of the basic unit; and transmitting the basic unit to a receiving end.

In another aspect of the present invention, a method of transmitting a basic unit in uplink is provided, the method comprising: arranging 6 pilot REs at both ends of a frequency axis of a basic unit when the basic unit contains 4 subcarriers by 9 or more OFDM(A) symbols; arranging data REs at remaining positions of the basic unit; and transmitting the basic unit to a receiving end.

In another aspect of the present invention, a method of transmitting a basic unit in uplink is provided, the method comprising: arranging 2 pilot REs at different positions in a frequency axis and a time axis in a basic unit when the basic unit contains 4 subcarriers by 6 OFDM(A) symbols; arranging data REs at remaining positions of the basic unit; and transmitting the basic unit to a receiving end.

In another aspect of the present invention, a method of transmitting a basic unit in uplink is provided, the method comprising: arranging 4 pilot REs at different positions in a frequency axis and a time axis in a basic unit when the basic unit contains 4 subcarriers by 12 OFDM(A) symbols; arranging data REs at remaining positions of the basic unit; and transmitting the basic unit to a receiving end.

In another aspect of the present invention, a method of transmitting a basic unit in uplink by a mobile station (MS) in an Orthogonal Frequency Division Multiple Access (OFDMA) wireless communication system is provided, the method comprising: forming the basic unit which size is 4 subcarriers by 6 OFDMA symbols, the basic unit containing a plurality of pilot and data resource elements (REs); configuring the pilot REs for single antenna in the basic unit at intervals of 3 subcarriers in a frequency axis and at intervals of 1 or 4 OFDMA symbols in a time axis; and transmitting the basic unit in uplink, wherein the RE is a time-frequency resource defined by one OFDMA symbol and one subcarrier, wherein the pilot and data REs are arranged in the basic unit as in Pattern Table 1 expressed as follows:

PATTERN TABLE 1

|        | s = 0 | s = 1 | s = 2 | s = 3 | s = 4 | s = 5 |
|--------|-------|-------|-------|-------|-------|-------|
| SC = 0 | P     | —     | —     | —     | P     | —     |
| SC = 1 | —     | —     | —     | —     | —     | —     |
| SC = 2 | —     | —     | —     | —     | —     | —     |
| SC = 3 | —     | P     | —     | —     | —     | P     | where "P" indicates the pilot RE, "-" indicates the data RE, "s" indicates an OFDMA symbol index, and "SC" indicates a subcarrier index.

Alternatively, a method of uplink transmitting a subframe containing a plurality of basic units by a mobile station (MS) in an Orthogonal Frequency Division Multiple Access (OFDMA) wireless communication system is provided, the method comprising: forming each basic unit which size is 4 subcarriers by 6 OFDMA symbols, the each basic unit containing a plurality of pilot and data resource elements (REs); configuring the pilot REs for single antenna in the each basic unit at intervals of 3 subcarriers in a frequency axis and at intervals of 1 or 4 OFDMA symbols in a time axis; and transmitting the subframe in uplink, wherein the RE is a time-frequency resource defined by one OFDMA symbol and one subcarrier, wherein the pilot and data REs are arranged in the each basic unit as in Pattern Table 1 expressed as follows:

PATTERN TABLE 1

|        | s = 0 | s = 1 | s = 2 | s = 3 | s = 4 | s = 5 |
|--------|-------|-------|-------|-------|-------|-------|
| SC = 0 | P     | —     | —     | —     | P     | —     |
| SC = 1 | —     | —     | —     | —     | —     | —     |
| SC = 2 | —     | —     | —     | —     | —     | —     |
| SC = 3 | —     | P     | —     | —     | —     | P     | where "P" indicates the pilot RE, "-" indicates the data RE, "s" indicates an OFDMA symbol index, and "SC" indicates a subcarrier index.

The subframe contains 6 OFDM(A) symbols. In case that the subframe contains 5 or 7 OFDM(A) symbols depending on the cyclic prefix size, the above Pattern Table 1 may be modified accordingly by excluding or adding one OFDM(A) symbol in such a manner that the modified Pattern Table still maintains allowable channel estimation ability.

The basic unit may be an uplink tile. In particular, the basic unit may be an uplink partial usage of subchannel (PUSC) tile. The basic unit may be an uplink IEEE 802.16m partial usage of subchannel (PUSC) tile. The basic unit may be distributed Resource Unit (DRU) for 16m PUSC A certain number of the basic units may form a larger resource unit. The certain number of the basic units includes six basic units. The larger resource unit includes a localized resource unit or a distributed resource unit. In this case, the basic units forming each larger resource unit may be contiguous in the frequency domain. Alternatively, the basic units forming each larger resource unit may be distributed in the frequency domain.

Locations of the pilot REs may be cyclically shifted in the frequency domain or in the time domain.

The Pilot REs may be power boosted with power of data REs in the same OFDMA symbol.

The method may further comprise mapping pilot and data symbols to corresponding pilot and data REs, respectively. The pilot and data symbols may be in the type of complex value representing amplitude and phase. For example, the data symbol may include a complex value representing amplitude and phase of modulated data.

The pilot REs may be used for dedicated pilot.

In another aspect of the present invention, a method of transmitting a basic unit in uplink by a mobile station (MS) in an Orthogonal Frequency Division Multiple Access (OFDMA) wireless communication system is provided, the method comprising: forming the basic unit which size is 4 subcarriers by 6 OFDMA symbols, the basic unit containing a plurality of pilot and data resource elements (REs); configuring the pilot REs for multiple antennas in the basic unit at intervals of 3 subcarriers in a frequency axis and at intervals of 5 OFDMA symbols in a time axis; and transmitting the basic unit in uplink, wherein the RE is a time-frequency resource defined by one OFDMA symbol and one subcarrier, wherein the pilot and data REs are arranged in the basic unit as in Pattern Table 2 expressed as follows:

PATTERN TABLE 2

|        | s = 0 | s = 1 | s = 2 | s = 3 | s = 4 | s = 5 |
|--------|-------|-------|-------|-------|-------|-------|
| SC = 0 | P0    | —     | —     | —     | —     | P1    |
| SC = 1 | —     | —     | —     | —     | —     | —     |
| SC = 2 | —     | —     | —     | —     | —     | —     |
| SC = 3 | P1    | —     | —     | —     | —     | P0    | where "P0" and "P1" indicate respective pilot REs for antenna ports 0 and 1, "-" indicates the data RE, "s" indicates an OFDMA symbol index, and "SC" indicates a subcarrier index.

Alternatively, a method of uplink transmitting a subframe containing a plurality of basic units by a mobile station (MS) in an Orthogonal Frequency Division Multiple Access (OFDMA) wireless communication system is provided, the method comprising: forming each basic unit which size is 4 subcarriers by 6 OFDMA symbols, the each basic unit containing a plurality of pilot and data resource elements (REs); configuring the pilot REs for multiple antennas in the each basic unit at intervals of 3 subcarriers in a frequency axis and at intervals of 5 OFDMA symbols in a time axis; and transmitting the subframe in uplink, wherein the RE is a time-frequency resource defined by one OFDMA symbol and one subcarrier, wherein the pilot and data REs are arranged in the each basic unit as in Pattern Table 2 expressed as follows:

PATTERN TABLE 2

|        | s = 0 | s = 1 | s = 2 | s = 3 | s = 4 | s = 5 |
|--------|-------|-------|-------|-------|-------|-------|
| SC = 0 | P0    | —     | —     | —     | —     | P1    |
| SC = 1 | —     | —     | —     | —     | —     | —     |
| SC = 2 | —     | —     | —     | —     | —     | —     |
| SC = 3 | P1    | —     | —     | —     | —     | P0    | where "P0" and "P1" indicate respective pilot REs for antenna ports 0 and 1, "-" indicates the data RE, "s" indicates an OFDMA symbol index, and "SC" indicates a subcarrier index.

The subframe contains 6 OFDM(A) symbols. In case that the subframe contains 5 or 7 OFDM(A) symbols depending on the cyclic prefix size, the above Pattern Table 1 may be modified accordingly by excluding or adding one OFDM(A) symbol in such a manner that the modified Pattern Table still maintains allowable channel estimation ability.

The basic unit may be an uplink tile. In particular, the basic unit may be an uplink partial usage of subchannel (PUSC) tile. The basic unit may be an uplink IEEE 802.16m partial usage of subchannel (PUSC) tile. The basic unit may be distributed Resource Unit (DRU) for 16m PUSC A certain number of the basic units may form a larger resource unit. The certain number of the basic units includes six basic units. The larger resource unit includes a localized resource unit or a distributed resource unit. In this case, the basic units forming each larger resource unit may be contiguous in the frequency domain. Alternatively, the basic units forming each larger resource unit may be distributed in the frequency domain.

The antenna port 0 and the antenna port 1 may be replaced with each other. Locations of the pilot REs may be cyclically shifted in the frequency domain or in the time domain.

The Pilot REs may be power boosted with power of data REs in the same OFDMA symbol.

The method may further comprise mapping pilot and data symbols to corresponding pilot and data REs, respectively. The pilot and data symbols may be in the type of conjugate value representing amplitude and phase. For example, the data symbol may include a conjugate value representing amplitude and phase of modulated data.

The pilot REs may be used for dedicated pilot.

Transmit diversity scheme or spatial multiplexing (SM) may be independently applied to the each basic unit. The transmit diversity scheme includes space time block code (STBC), space frequency block code (SFBC), cyclic delay diversity (CDD) or any combination thereof.

The sequential orders of the steps exemplified in the above various aspects of the present invention are up to implementation issues. Therefore the steps of the present invention could be carried out in various order depending manufactures unless the order is mentioned in particular.

According to the embodiments of the present invention, it is possible to reduce pilot overhead of the OFDM(A) system even when each basic unit for uplink has been extended on the time axis.

In addition, since the time interval and the frequency interval of pilot REs in the basic unit are maintained uniform or pilot REs are distributed to facilitate channel estimation, it is possible to guarantee the performance of channel estimation and to improve system performance.

Further, it is possible to guarantee backward compatibility to the legacy uplink PUSC structure of IEEE 802.16e.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The embodiments of the present invention provide a basic unit and a pilot structure which can reduce pilot overhead in uplink in an OFDM(A) system and can also guarantee high performance of channel estimation. In the embodiments of the present invention, pilot REs are allocated on the time axis in each basic unit taking into consideration coherent time so as to enable channel estimation that is robust to the low speed and high speed cases in the time domain in the basic unit. In addition, pilot REs are allocated on the frequency axis in each basic unit taking into consideration coherent bandwidth so as to achieve channel estimation that is robust to various delay spread in the frequency domain. The embodiments of the present invention also provide a basic unit and a pilot structure which can improve channel estimation performance using pilots of consecutive basic units which are allocated in the time/frequency axis.

Figure 1:
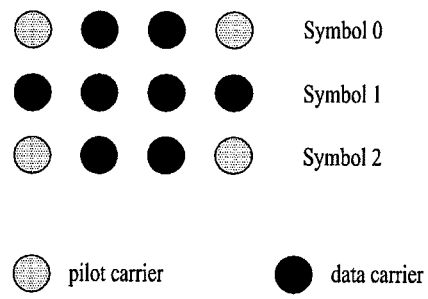
FIG. 1 illustrates a conventional IEEE 802.16e tile and pilot structure.
Figure 2A:
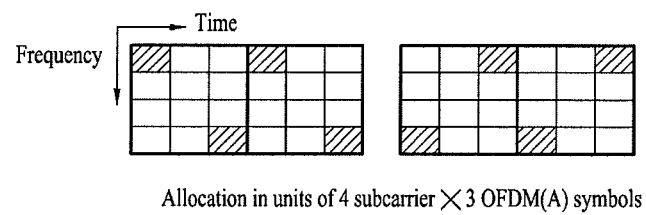
FIG. 2A illustrates an example wherein 1Tx or 1 stream pilots are allocated when each basic unit includes 4 subcarriers×3 OFDM(A) symbols according to an embodiment of the present invention.

FIG. 2A illustrates an example wherein 1Tx or 1 stream pilots are allocated when each basic unit includes 4 subcarriers×3 OFDM(A) symbols according to an embodiment of the present invention. In each 4×3 basic unit, two pilot REs are arranged and pilot overhead is 16.67%. 4×3 basic units can be consecutively allocated on the frequency axis or the time axis.

If two pilot REs are used per 4×3 basic unit, it is possible to reduce pilot overhead to half of that of the conventional IEEE 802.16e uplink PUSC structure. In order to guarantee robust channel estimation performance for both the low speed user case and high speed user case, it is preferable to arrange pilot REs in a 4×3 basic unit in a distributed manner at both ends (i.e., the first and third symbols) on the time axis in the 4×3 basic unit. In addition, in order to guarantee robust channel estimation performance taking into consideration frequency selectivity in channel estimation on the frequency axis, it is preferable to allocate pilot REs to both ends (i.e., the first and fourth subcarriers) on the frequency axis in a 4×3 basic unit.

It can be seen from the left side of FIG. 2A that, in each 4×3 basic unit, pilot REs are located at a subcarrier index of "0" when s=0 and at a subcarrier index of "3" when s=2. Here, the subcarrier index is an integer of no less than 0, which increases from top to bottom and OFDM(A) symbol index "s" is an integer of no less than 0, which increases from left to right.

It can also be seen from the right side of FIG. 2A that, in each 4×3 basic unit, pilot REs are located at a subcarrier index of "3" when s=0 and at a subcarrier index of "0" when s=2. The locations of the pilot REs can be cyclically shifted along the time axis or the frequency axis. These pilot patterns are summarized in the following tables.

TABLE 1

|        | s = 0 | s = 1 | s = 2 |
|--------|-------|-------|-------|
| SC = 0 | P     | —     | —     |
| SC = 1 | —     | —     | —     |
| SC = 2 | —     | —     | —     |
| SC = 3 | —     | —     | P     |

TABLE 2

|        | s = 0 | s = 1 | s = 2 |
|--------|-------|-------|-------|
| SC = 0 | —     | —     | P     |
| SC = 1 | —     | —     | —     |
| SC = 2 | —     | —     | —     |
| SC = 3 | P     | —     | —     |

In Tables 1 and 2, "P" indicates the pilot RE, "-" indicates the data RE, "s" indicates an OFDM(A) symbol index in the basic unit, and "SC" indicates a subcarrier index in the basic unit.

Figure 2B:
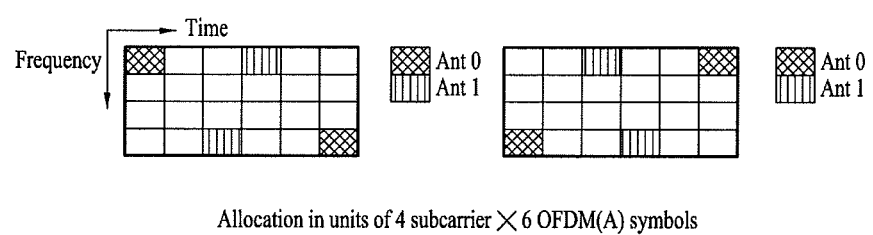
FIGS. 2B and 2C illustrate an example wherein 2Tx or 2 streams and 4Tx or 4 streams pilot REs are allocated when the size of a basic unit has been extended to 4 subcarriers×6 OFDM(A) symbols according to another embodiment of the present invention.
Figure 2C:
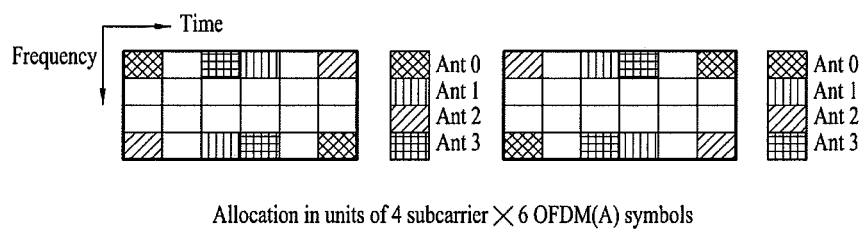

FIGS. 2B and 2C illustrate an example wherein 2Tx or 2 streams and 4Tx or 4 streams pilot REs are allocated when the size of a basic unit has been extended to 4 subcarriers×6 OFDM(A) symbols according to another embodiment of the present invention. Pilot patterns of FIGS. 2B and 2C are extended versions of the pilot pattern of FIG. 2A according to multiple antennas.

As shown in FIG. 2B, in the 4×6 basic unit, two 2Tx or 2 streams pilot REs are arranged for each antenna port and total pilot overhead is 16.67%. 4×6 basic units can be consecutively allocated on the frequency axis or the time axis. Pilot REs for the antenna port 0 are located at a subcarrier index of "0" when s=0 and at a subcarrier index of "3" when s=5. Pilot REs for the antenna port 1 are located at a subcarrier index of "3" when s=2 and at a subcarrier index of "0" when s=3. In another example, pilot REs for the antenna port 0 are located at a subcarrier index of "3" when s=0 and at a subcarrier index of "0" when s=5. Pilot REs for the antenna port 1 are located at a subcarrier index of "0" when s=2 and at a subcarrier index of "3" when s=3. The antenna ports 0 and 1 may be switched with each other. That is, the antenna ports 0 and 1 may be replaced with each other. For example, Pilot REs for the antenna port 0 are located at a subcarrier index of "3" when s=2 and at a subcarrier index of "0" when s=3. And Pilot REs for the antenna port 1 are located at a subcarrier index of "0" when s=0 and at a subcarrier index of "3" when s=5.

The locations of the pilot REs can be cyclically shifted along the time axis or the frequency axis. These pilot patterns are summarized in the following tables.

TABLE 3

|        | s = 0 | s = 1 | s = 2 | s = 3 | s = 4 | s = 5 |
|--------|-------|-------|-------|-------|-------|-------|
| SC = 0 | P0    | —     | —     | P1    | —     | —     |
| SC = 1 | —     | —     | —     | —     | —     | —     |
| SC = 2 | —     | —     | —     | —     | —     | —     |
| SC = 3 | —     | —     | P1    | —     | —     | P0    |

TABLE 4

|        | s = 0 | s = 1 | s = 2 | s = 3 | s = 4 | s = 5 |
|--------|-------|-------|-------|-------|-------|-------|
| SC = 0 | —     | —     | P1    | —     | —     | P0    |
| SC = 1 | —     | —     | —     | —     | —     | —     |
| SC = 2 | —     | —     | —     | —     | —     | —     |
| SC = 3 | P0    | —     | —     | P1    | —     | —     |

In Tables 3 and 4, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 2C, in the 4×6 basic unit, two 4Tx or 4 streams pilot REs are arranged for each antenna port and total pilot overhead is 33.34%. 4×6 basic units can be consecutively allocated on the frequency axis or the time axis. Pilot REs for the antenna port 0 are located at a subcarrier index of "0" when s=0 and at a subcarrier index of "3" when s=5. Pilot REs for the antenna port 1 are located at a subcarrier index of "3" when s=2 and at a subcarrier index of "0" when s=3. Pilot REs for the antenna port 2 are located at a subcarrier index of "3" when s=0 and at a subcarrier index of "0" when s=5. Pilot REs for the antenna port 3 are located at a subcarrier index of "0" when s=2 and at a subcarrier index of "3" when s=3. In another example, pilot REs for the antenna port 0 are located at a subcarrier index of "3" when s=0 and at a subcarrier index of "0" when s=5. Pilot REs for the antenna port 1 are located at a subcarrier index of "0" when s=2 and at a subcarrier index of "3" when s=3. Pilot REs for the antenna port 2 are located at a subcarrier index of "0" when s=0 and at a subcarrier index of "3" when s=5. Pilot REs for the antenna port 3 are located at a subcarrier index of "3" when s=2 and at a subcarrier index of "0" when s=3. The antenna ports may be switched with each other. The locations of the pilot REs can be cyclically shifted along the time axis or the frequency axis. These pilot patterns are summarized in the following tables.

TABLE 5

|        | s = 0 | s = 1 | s = 2 | s = 3 | s = 4 | s = 5 |
|--------|-------|-------|-------|-------|-------|-------|
| SC = 0 | P0    | —     | P3    | P1    | —     | P2    |
| SC = 1 | —     | —     | —     | —     | —     | —     |
| SC = 2 | —     | —     | —     | —     | —     | —     |
| SC = 3 | P2    | —     | P1    | P3    | —     | P0    |

TABLE 6

|        | s = 0 | s = 1 | s = 2 | s = 3 | s = 4 | s = 5 |
|--------|-------|-------|-------|-------|-------|-------|
| SC = 0 | P2    | —     | P1    | P3    | —     | P0    |
| SC = 1 | —     | —     | —     | —     | —     | —     |
| SC = 2 | —     | —     | —     | —     | —     | —     |
| SC = 3 | P0    | —     | P3    | P1    | —     | P2    |

In Tables 5 and 6, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 3A:
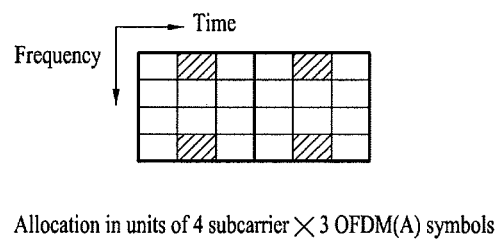
FIG. 3A illustrates an example wherein 1Tx or 1 stream pilots are allocated when each basic unit includes 4 subcarriers×3 OFDM(A) symbols according to another embodiment of the present invention.

FIG. 3A illustrates an example wherein 1Tx or 1 stream pilots are allocated when each basic unit includes 4 subcarriers×3 OFDM(A) symbols according to another embodiment of the present invention. In each 4×3 basic unit, two pilots are arranged and pilot overhead is 16.67%. 4×3 basic units can be consecutively allocated on the frequency axis or the time axis.

If two pilot REs are used per 4×3 basic unit, it is possible to reduce pilot overhead to half of that of the conventional IEEE 802.16e uplink PUSC structure. In addition, in order to guarantee robust channel estimation performance taking into consideration frequency selectivity in channel estimation on the frequency axis, it is preferable to allocate pilots to a 4×3 basic unit at both ends (i.e., the first and fourth subcarriers) on the frequency axis in the 4×3 basic unit. It can be seen from FIG. 3A that, in each 4×3 basic unit, pilot REs are located at a subcarrier index of "0" and at a subcarrier index of "3" when s=1. The locations of the pilot REs can be cyclically shifted along the time axis or the frequency axis. These pilot patterns are summarized in the following table.

TABLE 7

|        | s = 0 | s = 1 | s = 2 |
|--------|-------|-------|-------|
| SC = 0 | —     | P     | —     |
| SC = 1 | —     | —     | —     |
| SC = 2 | —     | —     | —     |
| SC = 3 | —     | P     | —     |

In Table 7, "P" indicates the pilot RE, "-" indicates the data RE, "s" indicates an OFDM(A) symbol index in the basic unit, and "SC" indicates a subcarrier index in the basic unit.

Figure 3B:
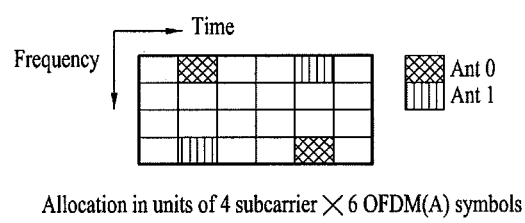
FIGS. 3B and 3C illustrate an example wherein 2Tx or 2 streams and 4Tx or 4 streams pilots are allocated when the size of a basic unit has been extended to 4 subcarriers×6 OFDM(A) symbols according to another embodiment of the present invention.
Figure 3C:
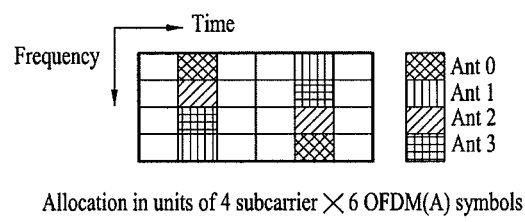

FIGS. 3B and 3C illustrate an example wherein 2Tx or 2 streams and 4Tx or 4 streams pilots are allocated when the size of a basic unit has been extended to 4 subcarriers×6 OFDM(A) symbols according to another embodiment of the present invention. Pilot patterns of FIGS. 3B and 3C are extended versions of the pilot pattern of FIG. 3A according to multiple antennas.

As shown in FIG. 3B, in the 4×6 basic unit, two 2Tx or 2 streams pilot REs are arranged for each antenna port and total pilot overhead is 16.67%. 4×6 basic units can be consecutively allocated on the frequency axis or the time axis. Pilot REs for the antenna port 0 are located at a subcarrier index of "0" when s=1 and at a subcarrier index of "3" when s=4. Pilot REs for the antenna port 1 are located at a subcarrier index of "3" when s=1 and at a subcarrier index of "0" when s=4. The antenna ports may be switched with each other. The locations of the pilot REs can be cyclically shifted along the time axis or the frequency axis. These pilot patterns are summarized in the following table.

TABLE 8

|        | s = 0 | s = 1 | s = 2 | s = 3 | s = 4 | s = 5 |
|--------|-------|-------|-------|-------|-------|-------|
| SC = 0 | —     | P0    | —     | —     | P1    | —     |
| SC = 1 | —     | —     | —     | —     | —     | —     |
| SC = 2 | —     | —     | —     | —     | —     | —     |
| SC = 3 | —     | P1    | —     | —     | P0    | —     |

In Table 8, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 3C, in the 4×6 basic unit, two 4Tx or 4 streams pilot REs are arranged for each antenna port and total pilot overhead is 33.34%. 4×6 basic units can be consecutively allocated on the frequency axis or the time axis. Pilot REs for the antenna port 0 are located at a subcarrier index of "0" when s=1 and at a subcarrier index of "3" when s=4. Pilot REs for the antenna port 1 are located at a subcarrier index of "3" when s=1 and at a subcarrier index of "0" when s=4. Pilot REs for the antenna port 2 are located at a subcarrier index of "1" when s=1 and at a subcarrier index of "2" when s=4. Pilot REs for the antenna port 3 are located at a subcarrier index of "2" when s=1 and at a subcarrier index of "1" when s=4. The antenna ports may be switched with each other. The locations of the pilot REs can be cyclically shifted along the time axis or the frequency axis. These pilot patterns are summarized in the following table.

TABLE 9

|        | s = 0 | s = 1 | s = 2 | s = 3 | s = 4 | s = 5 |
|--------|-------|-------|-------|-------|-------|-------|
| SC = 0 | —     | P0    | —     | —     | P1    | —     |
| SC = 1 | —     | P2    | —     | —     | P3    | —     |
| SC = 2 | —     | P3    | —     | —     | P2    | —     |
| SC = 3 | —     | P1    | —     | —     | P0    | —     |

In Table 9, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 4A:
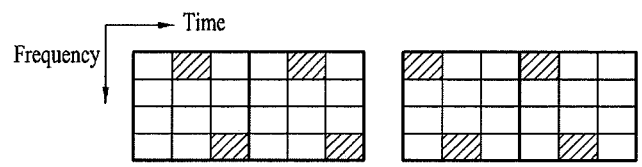
FIG. 4A illustrates an example wherein 1Tx or 1 stream pilots are allocated when each basic unit includes 4 subcarriers×3 OFDM(A) symbols according to another embodiment of the present invention.

FIG. 4A illustrates an example wherein 1Tx or 1 stream pilots are allocated when each basic unit includes 4 subcarriers×3 OFDM(A) symbols according to another embodiment of the present invention. In each 4×3 basic unit, two pilots are arranged and pilot overhead is 16.67%. 4×3 basic units can be consecutively allocated on the frequency axis or the time axis.

If two pilot REs are used per 4×3 basic unit, it is possible to reduce pilot overhead to half of that of the conventional IEEE 802.16e uplink PUSC structure. In order to guarantee robust channel estimation performance for both the low speed user case and high speed user case, it is preferable to arrange pilots adjacent to each other on the time axis in a 4×3 basic unit. In addition, in order to guarantee robust channel estimation performance taking into consideration frequency selectivity in channel estimation on the frequency axis, it is preferable to allocate pilots to a 4×3 basic unit at both ends (i.e., the first and fourth subcarriers) on the frequency axis in the 4×3 basic unit. Pilot REs are located at a subcarrier index of "0" when s=1 and at a subcarrier index of "3" when s=2. In another example, pilot REs are located at a subcarrier index of "0" when s=0 and at a subcarrier index of "3" when s=1. The locations of the pilot REs can be cyclically shifted along the time axis or the frequency axis. These pilot patterns are summarized in the following tables.

TABLE 10

|        | s = 0 | s = 1 | s = 2 |
|--------|-------|-------|-------|
| SC = 0 | —     | P     | —     |
| SC = 1 | —     | —     | —     |
| SC = 2 | —     | —     | —     |
| SC = 3 | —     | —     | P     |

TABLE 11

|        | s = 0 | s = 1 | s = 2 |
|--------|-------|-------|-------|
| SC = 0 | P     | —     | —     |
| SC = 1 | —     | —     | —     |
| SC = 2 | —     | —     | —     |
| SC = 3 | —     | P     | —     |

In Tables 10 and 11, "P" indicates the pilot RE, "-" indicates the data RE, "s" indicates an OFDM(A) symbol index in the basic unit, and "SC" indicates a subcarrier index in the basic unit.

Figure 4B:
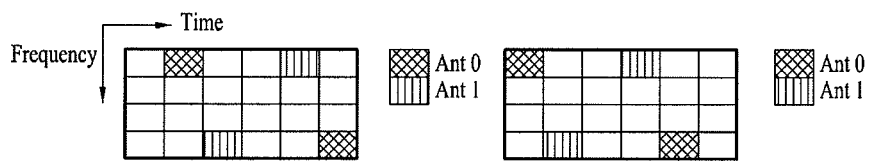
FIGS. 4B and 4C illustrate an example wherein 2Tx or 2 streams and 4Tx or 4 streams pilots are allocated when the size of a basic unit has been extended to 4 subcarriers×6 OFDM(A) symbols according to another embodiment of the present invention.
Figure 4C:
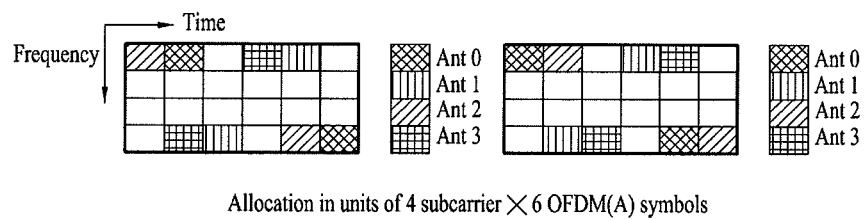

FIGS. 4B and 4C illustrate an example wherein 2Tx or 2 streams and 4Tx or 4 streams pilots are allocated when the size of a basic unit has been extended to 4 subcarriers×6 OFDM(A) symbols according to another embodiment of the present invention. Pilot patterns of FIGS. 4B and 4C are extended versions of the pilot pattern of FIG. 4A according to multiple antennas.

As shown in FIG. 4B, in the 4×6 basic unit, two 2Tx or 2 streams pilot REs are arranged for each antenna port and total pilot overhead is 16.67%. 4×6 basic units can be consecutively allocated on the frequency axis or the time axis. Pilot REs for the antenna port 0 are located at a subcarrier index of "0" when s=1 and at a subcarrier index of "3" when s=5. Pilot REs for the antenna port 1 are located at a subcarrier index of "3" when s=2 and at a subcarrier index of "0" when s=4. In another example, pilot REs for the antenna port 0 are located at a subcarrier index of "0" when s=0 and at a subcarrier index of "3" when s=4. Pilot REs for the antenna port 1 are located at a subcarrier index of "3" when s=1 and at a subcarrier index of "0" when s=3. The antenna ports may be switched with each other. The locations of the pilot REs can be cyclically shifted along the time axis or the frequency axis. These pilot patterns are summarized in the following tables.

TABLE 12

|        | s = 0 | s = 1 | s = 2 | s = 3 | s = 4 | s = 5 |
|--------|-------|-------|-------|-------|-------|-------|
| SC = 0 | —     | P0    | —     | —     | P1    | —     |
| SC = 1 | —     | —     | —     | —     | —     | —     |
| SC = 2 | —     | —     | —     | —     | —     | —     |
| SC = 3 | —     | —     | —     | P1    | —     | P0    |

TABLE 13

|        | s = 0 | s = 1 | s = 2 | s = 3 | s = 4 | s = 5 |
|--------|-------|-------|-------|-------|-------|-------|
| SC = 0 | P0    | —     | —     | P1    | —     | —     |
| SC = 1 | —     | —     | —     | —     | —     | —     |
| SC = 2 | —     | —     | —     | —     | —     | —     |
| SC = 3 | —     | P1    | —     | —     | P0    | —     |

In Tables 12 and 13, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 4C, in the 4×6 basic unit, two 4Tx or 4 streams pilot REs are arranged for each antenna port and total pilot overhead is 33.34%. 4×6 basic units can be consecutively allocated on the frequency axis or the time axis. Pilot REs for the antenna port 0 are located at a subcarrier index of "0" when s=1 and at a subcarrier index of "3" when s=5. Pilot REs for the antenna port 1 are located at a subcarrier index of "3" when s=2 and at a subcarrier index of "0" when s=4. Pilot REs for the antenna port 2 are located at a subcarrier index of "0" when s=0 and at a subcarrier index of "3" when s=4. Pilot REs for the antenna port 3 are located at a subcarrier index of "3" when s=1 and at a subcarrier index of "0" when s=3. In another example, pilot REs for the antenna port 0 are located at a subcarrier index of "0" when s=0 and at a subcarrier index of "3" when s=4. Pilot REs for the antenna port 1 are located at a subcarrier index of "3" when s=1 and at a subcarrier index of "0" when s=3. Pilot REs for the antenna port 2 are located at a subcarrier index of "0" when s=1 and at a subcarrier index of "3" when s=5. Pilot REs for the antenna port 3 are located at a subcarrier index of "3" when s=2 and at a subcarrier index of "0" when s=4. The antenna ports may be switched with each other. The locations of the pilot REs can be cyclically shifted along the time axis or the frequency axis. These pilot patterns are summarized in the following tables.

TABLE 14

|  | s = 0 | s = 1 | s = 2 | s = 3 | s = 4 | s = 5 |
|---|---|---|---|---|---|---|
| SC = 0 | P2 | P0 | — | P3 | P1 | — |
| SC = 1 | — | — | — | — | — | — |
| SC = 2 | — | — | — | — | — | — |
| SC = 3 | — | P3 | P1 | — | P2 | P0 |

TABLE 15

|  | s = 0 | s = 1 | s = 2 | s = 3 | s = 4 | s = 5 |
|---|---|---|---|---|---|---|
| SC = 0 | P0 | P2 | — | P1 | P3 | — |
| SC = 1 | — | — | — | — | — | — |
| SC = 2 | — | — | — | — | — | — |
| SC = 3 | — | P1 | P3 | — | P0 | P2 |

In Tables 14 and 15, "P0" to indicate respective pilot REs for the antenna ports 0 to 3, "-" indicates the data RE, "s" indicates an OFDM(A) symbol index in the basic unit, and "SC" indicates a subcarrier index in the basic unit.

Figure 5A:
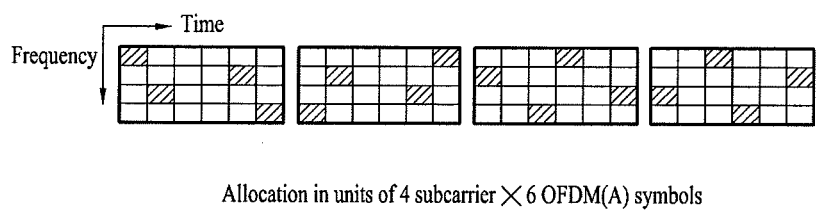
FIGS. 5A-5C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention.
Figure 5B:
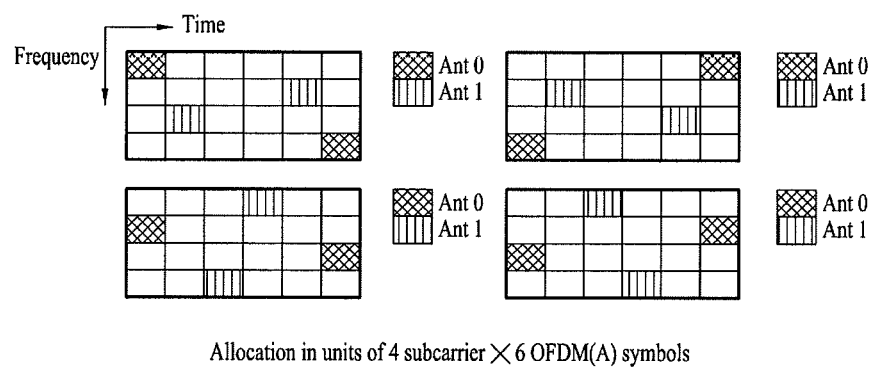
Figure 5C:
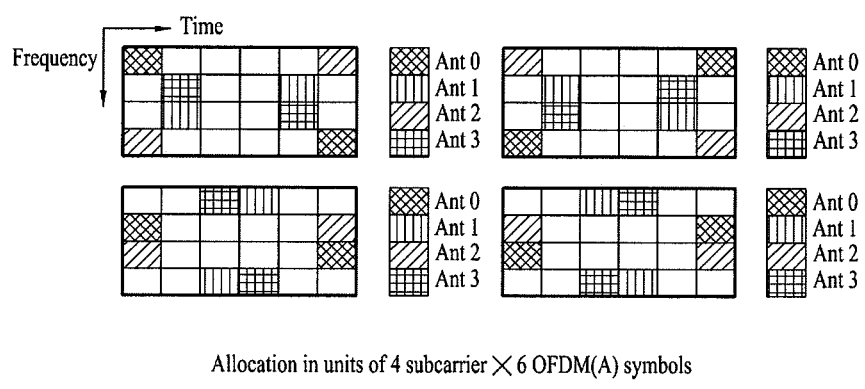

FIGS. 5A-5C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention. 4×6 basic units can be consecutively allocated on the frequency axis or the time axis.

As shown in FIG. 5A, pilot REs are located at a subcarrier index of "0" when s=0, at a subcarrier index of "2" when s=1, at a subcarrier index of "1" when s=4, and at a subcarrier index of "3" when s=5. In another example, pilot REs are located at a subcarrier index of "3" when s=0, at a subcarrier index of "1" when s=1, at a subcarrier index of "2" when s=4, and at a subcarrier index of "0" when s=5. In another example, pilot REs are located at a subcarrier index of "1" when s=0, at a subcarrier index of "3" when s=2, at a subcarrier index of "0" when s=3, and at a subcarrier index of "2" when s=5. In another example, pilot REs are located at a subcarrier index of "2" when s=0, at a subcarrier index of "0" when s=2, at a subcarrier index of "3" when s=3, and at a subcarrier index of "1" when s=5. The locations of the pilot REs can be cyclically shifted along the time axis or the frequency axis. These pilot patterns are summarized in the following tables.

TABLE 16

|  | s = 0 | s = 1 | s = 2 | s = 3 | s = 4 | s = 5 |
|---|---|---|---|---|---|---|
| SC = 0 | P | — | — | — | — | — |
| SC = 1 | — | — | — | — | P | — |
| SC = 2 | — | P | — | — | — | — |
| SC = 3 | — | — | — | — | — | P |

TABLE 17

|  | s = 0 | s = 1 | s = 2 | s = 3 | s = 4 | s = 5 |
|---|---|---|---|---|---|---|
| SC = 0 | — | — | — | — | — | P |
| SC = 1 | — | P | — | — | — | — |
| SC = 2 | — | — | — | — | P | — |
| SC = 3 | P | — | — | — | — | — |

TABLE 18

|  | s = 0 | s = 1 | s = 2 | s = 3 | s = 4 | s = 5 |
|---|---|---|---|---|---|---|
| SC = 0 | — | — | — | P | — | — |
| SC = 1 | P | — | — | — | — | — |
| SC = 2 | — | — | — | — | — | P |
| SC = 3 | — | — | P | — | — | — |

TABLE 19

|  | s = 0 | s = 1 | s = 2 | s = 3 | s = 4 | s = 5 |
|---|---|---|---|---|---|---|
| SC = 0 | — | — | P | — | — | — |
| SC = 1 | — | — | — | — | — | P |
| SC = 2 | P | — | — | — | — | — |
| SC = 3 | — | — | — | P | — | — |

In Tables 16 to 19, "P" indicates the pilot RE, "-" indicates the data RE, "s" indicates an OFDM(A) symbol index in the basic unit, and "SC" indicates a subcarrier index in the basic unit.

As shown in FIG. 5B, in the 4×6 basic unit, two 2Tx or 2 streams pilot REs are arranged for each antenna port and total pilot overhead is 16.67%. Pilot REs for the antenna port 0 are located at a subcarrier index of "0" when s=0 and at a subcarrier index of "3" when s=5. Pilot REs for the antenna port 1 are located at a subcarrier index of "2" when s=1 and at a subcarrier index of "1" when s=4. In another example, pilot REs for the antenna port 0 are located at a subcarrier index of "3" when s=0 and at a subcarrier index of "0" when s=5. Pilot REs for the antenna port 1 are located at a subcarrier index of "1" when s=1 and at a subcarrier index of "2" when s=4. In another example, pilot REs for the antenna port 0 are located at a subcarrier index of "1" when s=0 and at a subcarrier index of "2" when s=5. Pilot REs for the antenna port 1 are located at a subcarrier index of "3" when s=2 and at a subcarrier index of "0" when s=3. In another example, pilot REs for the antenna port 0 are located at a subcarrier index of "2" when s=0 and at a subcarrier index of "1" when s=5. Pilot REs for the antenna port 1 are located at a subcarrier index of "0" when s=2 and at a subcarrier index of "3" when s=3. The antenna ports may be switched with each other. The locations of the pilot REs can be cyclically shifted along the time axis or the frequency axis. These pilot patterns are summarized in the following tables.

TABLE 20

|        | s = 0 | s = 1 | s = 2 | s = 3 | s = 4 | s = 5 |
|--------|-------|-------|-------|-------|-------|-------|
| SC = 0 | P0    | —     | —     | —     | —     | —     |
| SC = 1 | —     | —     | —     | —     | P1    | —     |
| SC = 2 | —     | P1    | —     | —     | —     | —     |
| SC = 3 | —     | —     | —     | —     | —     | P0    |

TABLE 21

|        | s = 0 | s = 1 | s = 2 | s = 3 | s = 4 | s = 5 |
|--------|-------|-------|-------|-------|-------|-------|
| SC = 0 | —     | —     | —     | —     | —     | P0    |
| SC = 1 | —     | P1    | —     | —     | —     | —     |
| SC = 2 | —     | —     | —     | —     | P1    | —     |
| SC = 3 | P0    | —     | —     | —     | —     | —     |

TABLE 22

|        | s = 0 | s = 1 | s = 2 | s = 3 | s = 4 | s = 5 |
|--------|-------|-------|-------|-------|-------|-------|
| SC = 0 | —     | —     | —     | P1    | —     | —     |
| SC = 1 | P0    | —     | —     | —     | —     | —     |
| SC = 2 | —     | —     | —     | —     | —     | P0    |
| SC = 3 | —     | —     | P1    | —     | —     | —     |

TABLE 23

|        | s = 0 | s = 1 | s = 2 | s = 3 | s = 4 | s = 5 |
|--------|-------|-------|-------|-------|-------|-------|
| SC = 0 | —     | —     | P1    | —     | —     | —     |
| SC = 1 | —     | —     | —     | —     | —     | P0    |
| SC = 2 | P0    | —     | —     | —     | —     | —     |
| SC = 3 | —     | —     | —     | P1    | —     | —     |

In Tables 20 to 23, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 5C, in the 4×6 basic unit, two 4Tx or 4 streams pilot REs are arranged for each antenna port and total pilot overhead is 33.34%. Pilot REs for the antenna port 0 are located at a subcarrier index of "0" when s=0 and at a subcarrier index of "3" when s=5. Pilot REs for the antenna, port 1 are located at a subcarrier index of "2" when s=1 and at a subcarrier index of "1" when s=4. Pilot REs for the antenna port 2 are located at a subcarrier index of "3" when s=0 and at a subcarrier index of "0" when s=5. Pilot REs for the antenna port 3 are located at a subcarrier index of "1" when s=1 and at a subcarrier index of "2" when s=4. In another example, pilot REs for the antenna port 0 are located at a subcarrier index of "3" when s=0 and at a subcarrier index of "0" when s=5. Pilot REs for the antenna port 1 are located at a subcarrier index of "1" when s=1 and at a subcarrier index of "2" when s=4. Pilot REs for the antenna port 2 are located at a subcarrier index of "0" when s=0 and at a subcarrier index of "3" when s=5. Pilot REs for the antenna port 3 are located at a subcarrier index of "2" when s=1 and at a subcarrier index of "1" when s=4.

In another example, pilot REs for the antenna port 0 are located at a subcarrier index of "1" when s=0 and at a subcarrier index of "2" when s=5. Pilot REs for the antenna port 1 are located at a subcarrier index of "3" when s=2 and at a subcarrier index of "0" when s=3. Pilot REs for the antenna port 2 are located at a subcarrier index of "2" when s=0 and at a subcarrier index of "1" when s=5. Pilot REs for the antenna port 3 are located at a subcarrier index of "0" when s=2 and at a subcarrier index of "3" when s=3. In another example, pilot REs for the antenna port 0 are located at a subcarrier index of "2" when s=0 and at a subcarrier index of "1" when s=5. Pilot REs for the antenna port 1 are located at a subcarrier index of "0" when s=2 and at a subcarrier index of "3" when s=3. Pilot REs for the antenna port 2 are located at a subcarrier index of "1" when s=0 and at a subcarrier index of "2" when s=5. Pilot REs for the antenna port 3 are located at a subcarrier index of "3" when s=2 and at a subcarrier index of "0" when s=3. The antenna ports may be switched with each other. The locations of the pilot REs can be cyclically shifted along the time axis or the frequency axis. These pilot patterns are summarized in the following tables.

TABLE 24

|        | s = 0 | s = 1 | s = 2 | s = 3 | s = 4 | s = 5 |
|--------|-------|-------|-------|-------|-------|-------|
| SC = 0 | P0    | —     | —     | —     | —     | P2    |
| SC = 1 | —     | P3    | —     | —     | P1    | —     |
| SC = 2 | —     | P1    | —     | —     | P3    | —     |
| SC = 3 | P2    | —     | —     | —     | —     | P0    |

TABLE 25

|        | s = 0 | s = 1 | s = 2 | s = 3 | s = 4 | s = 5 |
|--------|-------|-------|-------|-------|-------|-------|
| SC = 0 | P2    | —     | —     | —     | —     | P0    |
| SC = 1 | —     | P1    | —     | —     | P3    | —     |
| SC = 2 | —     | P3    | —     | —     | P1    | —     |
| SC = 3 | P0    | —     | —     | —     | —     | P2    |

TABLE 26

|        | s = 0 | s = 1 | s = 2 | s = 3 | s = 4 | s = 5 |
|--------|-------|-------|-------|-------|-------|-------|
| SC = 0 | —     | —     | P3    | P1    | —     | —     |
| SC = 1 | P0    | —     | —     | —     | —     | P2    |
| SC = 2 | P2    | —     | —     | —     | —     | P0    |
| SC = 3 | —     | —     | P1    | P3    | —     | —     |

TABLE 27

|        | s = 0 | s = 1 | s = 2 | s = 3 | s = 4 | s = 5 |
|--------|-------|-------|-------|-------|-------|-------|
| SC = 0 | —     | —     | P1    | P3    | —     | —     |
| SC = 1 | P2    | —     | —     | —     | —     | P0    |
| SC = 2 | P0    | —     | —     | —     | —     | P2    |
| SC = 3 | —     | —     | P3    | P1    | —     | —     |

In Tables 24 to 27, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 6A:
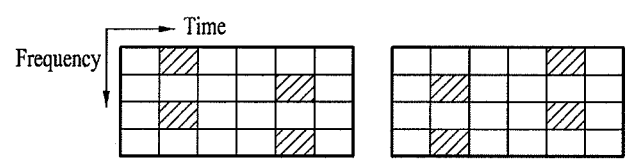
FIGS. 6A-6C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention.
Figure 6B:
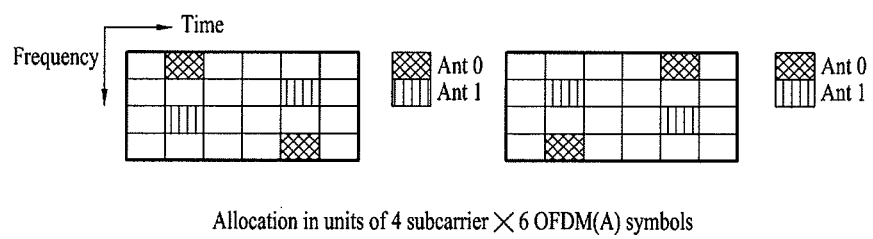
Figure 6C:
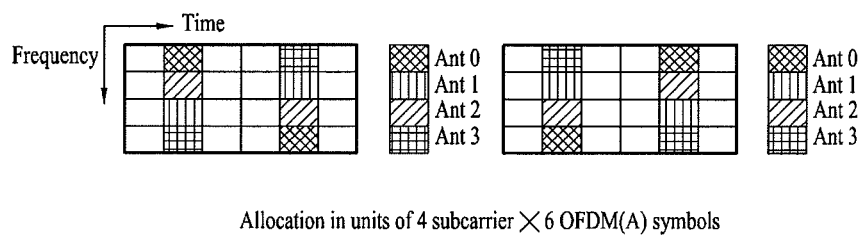

FIGS. 6A-6C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention. 4×6 basic units can be consecutively allocated on the frequency axis or the time axis.

As shown in FIG. 6A, pilot REs are located at a subcarrier index of "0" and at a subcarrier index of "2" when s=1 and are located at a subcarrier index of "1" and at a subcarrier index of "3" when s=4. In another example, pilot REs are located at a subcarrier index of "1" and at a subcarrier index of "3" when s=1 and are located at a subcarrier index of "0" and at a subcarrier index of "2" when s=4. The locations of the pilot REs can be cyclically shifted along the time axis or the frequency axis. These pilot patterns are summarized in the following tables.

TABLE 28

|        | s = 0 | s = 1 | s = 2 | s = 3 | s = 4 | s = 5 |
|--------|-------|-------|-------|-------|-------|-------|
| SC = 0 | —     | P     | —     | —     | —     | —     |
| SC = 1 | —     | —     | —     | —     | P     | —     |
| SC = 2 | —     | P     | —     | —     | —     | —     |
| SC = 3 | —     | —     | —     | —     | P     | —     |

TABLE 29

|        | s = 0 | s = 1 | s = 2 | s = 3 | s = 4 | s = 5 |
|--------|-------|-------|-------|-------|-------|-------|
| SC = 0 | —     | —     | —     | —     | P     | —     |
| SC = 1 | —     | P     | —     | —     | —     | —     |
| SC = 2 | —     | —     | —     | —     | P     | —     |
| SC = 3 | —     | P     | —     | —     | —     | —     |

In Tables 28 and 29, "P" indicates the pilot RE, "-" indicates the data RE, "s" indicates an OFDM(A) symbol index in the basic unit, and "SC" indicates a subcarrier index in the basic unit.

As shown in FIG. 6B, in the 4×6 basic unit, two 2Tx or 2 streams pilot REs are arranged for each antenna port and total pilot overhead is 16.67%. Pilot REs for the antenna port 0 are located at a subcarrier index of "0" when s=1 and at a subcarrier index of "3" when s=4. Pilot REs for the antenna port 1 are located at a subcarrier index of "2" when s=1 and at a subcarrier index of "1" when s=4. In another example, pilot REs for the antenna port 0 are located at a subcarrier index of "3" when s=1 and at a subcarrier index of "0" when s=4. Pilot REs for the antenna port 1 are located at a subcarrier index of "1" when s=1 and at a subcarrier index of "2" when s=4. The antenna ports may be switched with each other. The locations of the pilot REs can be cyclically shifted along the time axis or the frequency axis. These pilot patterns are summarized in the following tables.

TABLE 30

|        | s = 0 | s = 1 | s = 2 | s = 3 | s = 4 | s = 5 |
|--------|-------|-------|-------|-------|-------|-------|
| SC = 0 | —     | P0    | —     | —     | —     | —     |
| SC = 1 | —     | —     | —     | —     | P1    | —     |
| SC = 2 | —     | P1    | —     | —     | —     | —     |
| SC = 3 | —     | —     | —     | —     | P0    | —     |

TABLE 31

|        | s = 0 | s = 1 | s = 2 | s = 3 | s = 4 | s = 5 |
|--------|-------|-------|-------|-------|-------|-------|
| SC = 0 | —     | —     | —     | —     | P0    | —     |
| SC = 1 | —     | P1    | —     | —     | —     | —     |
| SC = 2 | —     | —     | —     | —     | P1    | —     |
| SC = 3 | —     | P0    | —     | —     | —     | —     |

In Tables 30 and 31, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 6C, in the 4×6 basic unit, two 4Tx or 4 streams pilot REs are arranged for each antenna port and total pilot overhead is 33.34%. Pilot REs for the antenna port 0 are located at a subcarrier index of "0" when s=1 and at a subcarrier index of "3" when s=4. Pilot REs for the antenna port 1 are located at a subcarrier index of "2" when s=1 and at a subcarrier index of "1" when s=4. Pilot REs for the antenna port 2 are located at a subcarrier index of "1" when s=1 and at a subcarrier index of "2" when s=4. Pilot REs for the antenna port 3 are located at a subcarrier index of "3" when s=1 and at a subcarrier index of "0" when s=4. In another example, pilot REs for the antenna port 0 are located at a subcarrier index of "3" when s=1 and at a subcarrier index of "0" when s=4. Pilot REs for the antenna port 1 are located at a subcarrier index of "1" when s=1 and at a subcarrier index of "2" when s=4. Pilot REs for the antenna port 2 are located at a subcarrier index of "2" when s=1 and at a subcarrier index of "1" when s=4. Pilot REs for the antenna port 3 are located at a subcarrier index of "0" when s=1 and at a subcarrier index of "3" when s=4. The antenna ports may be switched with each other. The locations of the pilot REs can be cyclically shifted along the time axis or the frequency axis. These pilot patterns are summarized in the following tables.

TABLE 32

|        | s = 0 | s = 1 | s = 2 | s = 3 | s = 4 | s = 5 |
|--------|-------|-------|-------|-------|-------|-------|
| SC = 0 | —     | P0    | —     | —     | P3    | —     |
| SC = 1 | —     | P2    | —     | —     | P1    | —     |
| SC = 2 | —     | P1    | —     | —     | P2    | —     |
| SC = 3 | —     | P3    | —     | —     | P0    | —     |

TABLE 33

|        | s = 0 | s = 1 | s = 2 | s = 3 | s = 4 | s = 5 |
|--------|-------|-------|-------|-------|-------|-------|
| SC = 0 | —     | P3    | —     | —     | P0    | —     |
| SC = 1 | —     | P1    | —     | —     | P2    | —     |
| SC = 2 | —     | P2    | —     | —     | P1    | —     |
| SC = 3 | —     | P0    | —     | —     | P3    | —     |

In Tables 32 and 33, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 7A:
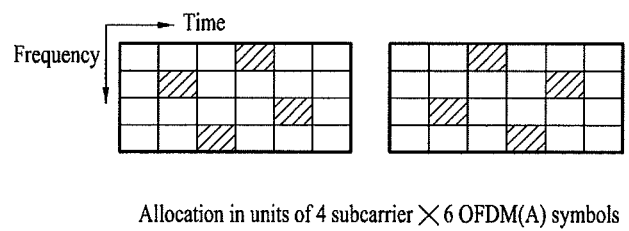
FIGS. 7A-7C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention.
Figure 7B:
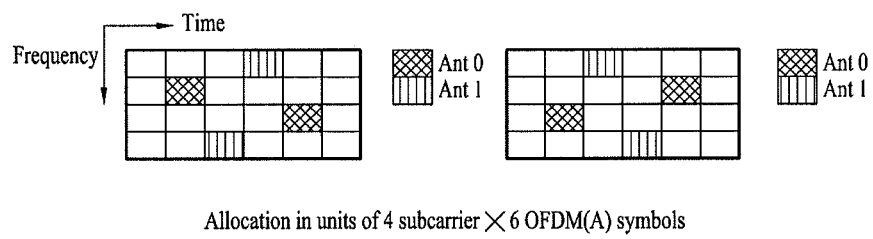
Figure 7C:
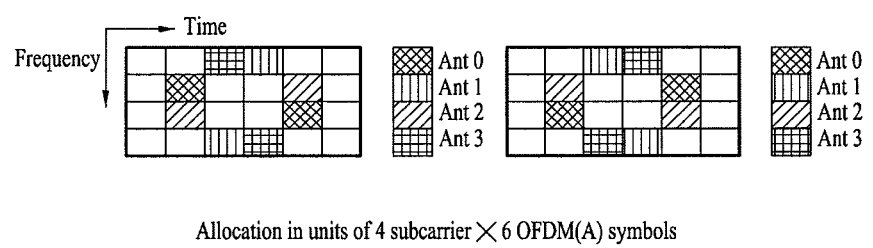

FIGS. 7A-7C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention. 4×6 basic units can be consecutively allocated on the frequency axis or the time axis.

As shown in FIG. 7A, pilot REs are located at a subcarrier index of "1" when s=1, at a subcarrier index of "3" when s=2, at a subcarrier index of "0" when s=3, and at a subcarrier index of "2" when s=4. In another example, pilot REs are located at a subcarrier index of "2" when s=1, at a subcarrier index of "0" when s=2, at a subcarrier index of "3" when s=3, and at a subcarrier index of "1" when s=4. The locations of the pilot REs can be cyclically shifted along the time axis or the frequency axis. These pilot patterns are summarized in the following tables.

TABLE 34

|        | s = 0 | s = 1 | s = 2 | s = 3 | s = 4 | s = 5 |
|--------|-------|-------|-------|-------|-------|-------|
| SC = 0 | —     | —     | —     | P     | —     | —     |
| SC = 1 | —     | P     | —     | —     | —     | —     |
| SC = 2 | —     | —     | —     | —     | P     | —     |
| SC = 3 | —     | —     | P     | —     | —     | —     |

TABLE 35

|      | s = 0 | s = 1 | s = 2 | s = 3 | s = 4 | s = 5 |
|------|-------|-------|-------|-------|-------|-------|
| SC = 0 | — | — | P | — | — | — |
| SC = 1 | — | — | — | — | P | — |
| SC = 2 | — | P | — | — | — | — |
| SC = 3 | — | — | — | P | — | — |

In Tables 34 and 35, "P" indicates the pilot RE, "-" indicates the data RE, "s" indicates an OFDM(A) symbol index in the basic unit, and "SC" indicates a subcarrier index in the basic unit.

As shown in FIG. 7B, in the 4×6 basic unit, two 2Tx or 2 streams pilot REs are arranged for each antenna port and total pilot overhead is 16.67%. Pilot REs for the antenna port 0 are located at a subcarrier index of "1" when s=1 and at a subcarrier index of "2" when s=4. Pilot REs for the antenna port 1 are located at a subcarrier index of "3" when s=2 and at a subcarrier index of "0" when s=3. In another example, pilot REs for the antenna port 0 are located at a subcarrier index of "2" when s=1 and at a subcarrier index of "1" when s=4. Pilot REs for the antenna port 1 are located at a subcarrier index of "0" when s=2 and at a subcarrier index of "3" when s=3. The antenna ports may be switched with each other. The locations of the pilot REs can be cyclically shifted along the time axis or the frequency axis. These pilot patterns are summarized in the following tables.

TABLE 36

|      | s = 0 | s = 1 | s = 2 | s = 3 | s = 4 | s = 5 |
|------|-------|-------|-------|-------|-------|-------|
| SC = 0 | — | — | — | P1 | — | — |
| SC = 1 | — | P0 | — | — | — | — |
| SC = 2 | — | — | — | — | P0 | — |
| SC = 3 | — | — | P1 | — | — | — |

TABLE 37

|      | s = 0 | s = 1 | s = 2 | s = 3 | s = 4 | s = 5 |
|------|-------|-------|-------|-------|-------|-------|
| SC = 0 | — | — | P1 | — | — | — |
| SC = 1 | — | — | — | — | P0 | — |
| SC = 2 | — | P0 | — | — | — | — |
| SC = 3 | — | — | — | P1 | — | — |

In Tables 36 to 37, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 7C, in the 4×6 basic unit, two 4Tx or 4 streams pilot REs are arranged for each antenna port and total pilot overhead is 33.34%. Pilot REs for the antenna port 0 are located at a subcarrier index of "1" when s=1 and at a subcarrier index of "2" when s=4. Pilot REs for the antenna port 1 are located at a subcarrier index of "3" when s=2 and at a subcarrier index of "0" when s=3. Pilot REs for the antenna port 2 are located at a subcarrier index of "2" when s=1 and at a subcarrier index of "1" when s=4. Pilot REs for the antenna port 3 are located at a subcarrier index of "0" when s=2 and at a subcarrier index of "3" when s=3. In another example, pilot REs for the antenna port 0 are located at a subcarrier index of "2" when s=1 and at a subcarrier index of "1" when s=4. Pilot REs for the antenna port 1 are located at a subcarrier index of "0" when s=2 and at a subcarrier index of "3" when s=3. Pilot REs for the antenna port 2 are located at a subcarrier index of "1" when s=1 and at a subcarrier index of "2" when s=4. Pilot REs for the antenna port 3 are located at a subcarrier index of "3" when s=2 and at a subcarrier index of "0" when s=3. The antenna ports may be switched with each other. The locations of the pilot REs can be cyclically shifted along the time axis or the frequency axis. These pilot patterns are summarized in the following tables.

TABLE 38

|      | s = 0 | s = 1 | s = 2 | s = 3 | s = 4 | s = 5 |
|------|-------|-------|-------|-------|-------|-------|
| SC = 0 | — | — | P3 | P1 | — | — |
| SC = 1 | — | P0 | — | — | P2 | — |
| SC = 2 | — | P2 | — | — | P0 | — |
| SC = 3 | — | — | P1 | P3 | — | — |

TABLE 39

|      | s = 0 | s = 1 | s = 2 | s = 3 | s = 4 | s = 5 |
|------|-------|-------|-------|-------|-------|-------|
| SC = 0 | — | — | P1 | P3 | — | — |
| SC = 1 | — | P2 | — | — | P0 | — |
| SC = 2 | — | P0 | — | — | P2 | — |
| SC = 3 | — | — | P3 | P1 | — | — |

In Tables 38 and 39, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 8A:
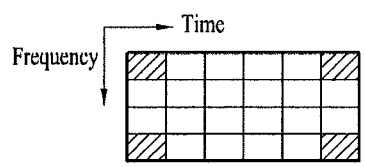
FIGS. 8A-8C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention.
Figure 8B:
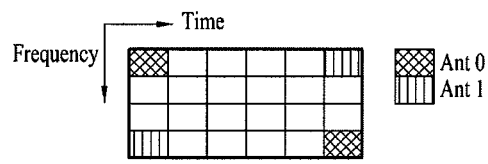
Figure 8C:
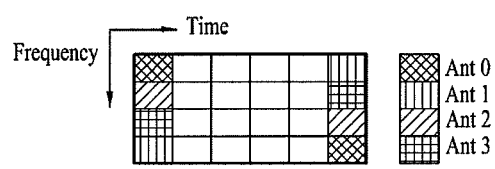

FIGS. 8A-8C illustrate an example wherein 1Tx or 1 stream, 2Tx or 2 streams, and 4Tx or 4 streams pilots are allocated when each basic unit includes 4 subcarriers×6 OFDM(A) symbols according to another embodiment of the present invention. 4×6 basic units can be consecutively allocated on the frequency axis or the time axis.

As shown in FIG. 8A, if two pilot REs are used per 4×6 basic unit, it is possible to reduce pilot overhead to half of that of the conventional IEEE 802.16e uplink PUSC structure. In order to guarantee robust channel estimation performance for the low speed user case, it is preferable to arrange pilots in a 4×6 basic unit in a distributed manner at both ends on the time axis in the 4×6 basic unit. In addition, in order to guarantee robust channel estimation performance taking into consideration frequency selectivity in channel estimation on the frequency axis, it is preferable to allocate pilots to a 4×6 basic unit at both ends (i.e., the first and fourth subcarriers) on the frequency axis in the 4×6 basic unit. In each 4×6 basic unit, pilot REs are located at a subcarrier index of "0" and at a subcarrier index of "3" when s=0 and are located at a subcarrier index of "0" and at a subcarrier index of "3" when s=5. The locations of the pilot REs can be cyclically shifted along the time axis or the frequency axis. These pilot patterns are summarized in the following table.

TABLE 40

|      | s = 0 | s = 1 | s = 2 | s = 3 | s = 4 | s = 5 |
|------|-------|-------|-------|-------|-------|-------|
| SC = 0 | P | — | — | — | — | P |
| SC = 1 | — | — | — | — | — | — |
| SC = 2 | — | — | — | — | — | — |
| SC = 3 | P | — | — | — | — | P |

In Table 40, "P" indicates the pilot RE, "-" indicates the data RE, "s" indicates an OFDM(A) symbol index in the basic unit, and "SC" indicates a subcarrier index in the basic unit.

As shown in FIG. 8B, in the 4×6 basic unit, two 2Tx or 2 streams pilot REs are arranged for each antenna port and total pilot overhead is 16.67%. Pilot REs for the antenna port 0 are located at a subcarrier index of "0" when s=0 and at a subcarrier index of "3" when s=5. Pilot REs for the antenna port 1 are located at a subcarrier index of "3" when s=0 and at a subcarrier index of "0" when s=5. The antenna ports may be switched with each other. The locations of the pilot REs can be cyclically shifted along the time axis or the frequency axis. These pilot patterns are summarized in the following table.

TABLE 41

|        | s = 0 | s = 1 | s = 2 | s = 3 | s = 4 | s = 5 |
|--------|-------|-------|-------|-------|-------|-------|
| SC = 0 | P0    | —     | —     | —     | —     | P1    |
| SC = 1 | —     | —     | —     | —     | —     | —     |
| SC = 2 | —     | —     | —     | —     | —     | —     |
| SC = 3 | P1    | —     | —     | —     | —     | P0    |

In Table 41, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

These pilot patterns are especially preferable for uplink transmission with 2Tx antennas or 2 streams for the following reasons.

First, in the case of a wireless communication system which supports Multi-Input Multi-Output (MIMO) technologies, the pilot patterns of FIG. 8B can efficiently support Space Time Block Code (STBC) and Space Frequency Block Code (STBC). To support STBC, subcarriers for transmission of control information and data, excluding pilots, should constitute an even number of OFDM(A) symbols on the time axis. Especially, consecutively allocating paired OFDM(A) symbols in each subcarrier unit can achieve a further improvement in STBC performance. This is because that, in STBC, a high gain can be achieved if channels that paired OFDM(A) symbols in each subcarrier unit experience are identical or similar. Referring to FIG. 8B, OFDM(A) symbols in each subcarrier unit, excluding pilots, are consecutive on the time axis and are also even in number. To support SFBC, the number of subcarriers for transmission of control information and data, excluding pilots, should be even on the frequency axis. Especially, consecutively allocating paired subcarriers in each OFDM(A) symbol can achieve a further improvement in SFBC performance. This is because that, in SFBC, a high gain can be achieved if channels that paired subcarriers experience are identical or similar. Referring to FIG. 8B, subcarriers excluding pilots in each OFDM(A) symbol are consecutive and are also even in number. The pilot patterns of FIG. 8B can effectively support the MIMO system.

Second, since pilots for the antenna ports 0 and 1 are allocated to the same OFDM(A) symbol, it is possible to improve performance of channel estimation through pilot boosting. For example, when data and pilots for the antenna port 0 are transmitted, no pilot REs for the antenna port 1 are transmitted. In this case, power for allocation to the pilots for the antenna port 1 can be additionally allocated to the pilots for the antenna port 0. This can improve performance of channel estimation through pilot boosting. This also helps in solving the power balancing problem in uplink transmission with limited available power.

Third, it is possible to perform efficient channel estimation using as much coherent time and coherent bandwidth as possible. Specifically, even in an environment in which channel delay spread is significant, channels almost never change or only slightly change in 4 consecutive subcarrier units. Unless the terminal is in motion at high speed, channel change is not great in 6 or less consecutive OFDM(A) symbols. In addition, even when the speed of the terminal is increased such that it experiences a high-speed channel, the channel linearly changes in 6 or less consecutive OFDM(A) symbols. Referring to FIG. 8B, 2 pilots for each of the antenna ports 0 and 1 are located at both diagonal ends of a 4×6 basic unit. This utilizes as much coherent time and coherent bandwidth as possible, thereby achieving efficient channel estimation.

Fourth, since pilots are allocated to each 4×6 basic unit at edges thereof, it is possible to prevent degradation of channel estimation performance due to extrapolation during channel estimation.

As shown in FIG. 8C, in the 4×6 basic unit, two 4Tx or 4 streams pilot REs are arranged for each antenna port and total pilot overhead is 33.34%. Pilot REs for the antenna port 0 are located at a subcarrier index of "0" when s=0 and at a subcarrier index of "3" when s=5. Pilot REs for the antenna port 1 are located at a subcarrier index of "3" when s=0 and at a subcarrier index of "0" when s=5. Pilot REs for the antenna port 2 are located at a subcarrier index of "1" when s=0 and at a subcarrier index of "2" when s=5. Pilot REs for the antenna port 3 are located at a subcarrier index of "2" when s=0 and at a subcarrier index of "1" when s=5. The antenna ports may be switched with each other. The locations of the pilot REs can be cyclically shifted along the time axis or the frequency axis. These pilot patterns are summarized in the following table.

TABLE 42

|        | s = 0 | s = 1 | S = 2 | s = 3 | s = 4 | s = 5 |
|--------|-------|-------|-------|-------|-------|-------|
| SC = 0 | P0    | —     | —     | —     | —     | P1    |
| SC = 1 | P2    | —     | —     | —     | —     | P3    |
| SC = 2 | P3    | —     | —     | —     | —     | P2    |
| SC = 3 | P1    | —     | —     | —     | —     | P0    |

In Table 42, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 9A:
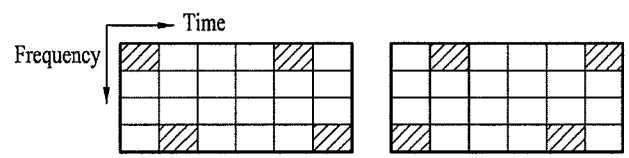
FIGS. 9A-9C illustrates an example wherein 1Tx or 1 stream, 2Tx or 2 streams, and 4Tx or 4 streams pilots are allocated when each basic unit includes 4 subcarriers×6 OFDM(A) symbols according to an embodiment of the present invention.
Figure 9B:
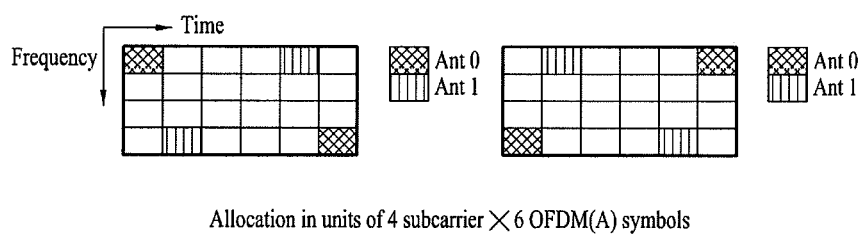
Figure 9C:
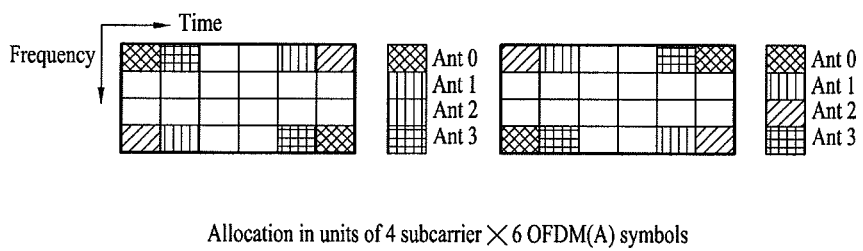

FIGS. 9A-9C illustrates an example wherein 1Tx or 1 stream, 2Tx or 2 streams, and 4Tx or 4 streams pilots are allocated when each basic unit includes 4 subcarriers×6 OFDM(A) symbols according to an embodiment of the present invention. 4×6 basic units can be consecutively allocated on the frequency axis or the time axis.

As shown in FIG. 9A, pilot REs are located at a subcarrier index of "0" when s=0, at a subcarrier index of "3" when s=1, at a subcarrier index of "0" when s=4, and at a subcarrier index of "3" when s=5. In another example, pilot REs are located at a subcarrier index of "3" when s=0, at a subcarrier index of "0" when s=1, at a subcarrier index of "3" when s=4, and at a subcarrier index of "0" when s=5. The locations of the pilot REs can be cyclically shifted along the time axis or the frequency axis. These pilot patterns are summarized in the following tables.

TABLE 43

|        | s = 0 | s = 1 | S = 2 | s = 3 | s = 4 | s = 5 |
|--------|-------|-------|-------|-------|-------|-------|
| SC = 0 | P     | —     | —     | —     | P     | —     |
| SC = 1 | —     | —     | —     | —     | —     | —     |
| SC = 2 | —     | —     | —     | —     | —     | —     |
| SC = 3 | —     | P     | —     | —     | —     | P     |

TABLE 44

|        | s = 0 | s = 1 | S = 2 | s = 3 | s = 4 | s = 5 |
|--------|-------|-------|-------|-------|-------|-------|
| SC = 0 | —     | P     | —     | —     | —     | P     |
| SC = 1 | —     | —     | —     | —     | —     | —     |
| SC = 2 | —     | —     | —     | —     | —     | —     |
| SC = 3 | P     | —     | —     | —     | P     | —     |

In Tables 43 and 44, "P" indicates the pilot RE, "-" indicates the data RE, "s" indicates an OFDM(A) symbol index in the basic unit, and "SC" indicates a subcarrier index in the basic unit.

These pilot patterns are especially preferable for uplink transmission with a 1Tx antenna or 1 stream for the following reasons.

First, the pilot patterns have a structure suitable for achieving a channel estimation gain through pilot boosting. In the case of the pilot patterns of FIG. 9A, pilot REs are located at different OFDM(A) symbols on the time axis. Accordingly, when pilot REs and data REs are simultaneously transmitted or pilot REs alone are transmitted, it is possible to improve channel estimation performance through pilot boosting effects. That is, a portion of power for allocation to data REs can be allocated to pilot REs, thereby achieving a performance gain through pilot boosting. However, in the case where a number of pilots for a single antenna are allocated to the same OFDM(A) symbol, the performance improvement is not great since limited power of data REs is distributed over a number of pilots. Specifically, in the case of the pilot patterns of FIG. 9A, a portion of power for allocation to 3 data REs in one OFDM(A) symbol is allocated to pilot REs, thereby achieving a performance gain through pilot boosting. However, in the case where 2 pilot REs are included in one OFDM(A) symbol, power for use in 2 data REs is allocated to 2 pilot REs and therefore the improvement of performance through pilot boosting is small, compared to when one pilot RE is included in one OFDM(A) symbol. Especially, taking into consideration the fact that uplink power is limited, the use of one pilot RE in one OFDM(A) symbol helps in solving the power balancing problem.

Second, it is possible to perform efficient channel estimation using as much coherent time and coherent bandwidth as possible. Specifically, even when channel delay spread is significant, the coherent bandwidth is 4 or more subcarriers and thus the channel almost never changes or only slightly changes in 4 consecutive subcarriers. In addition, even when the speed of the terminal is increased such that it experiences a high-speed channel, the coherent time is 3 or more OFDM(A) symbols and thus the channel changes in units of 3 or more OFDM(A) symbols (i.e., the channel almost never changes in 3 consecutive OFDM(A) symbols). In the pilot patterns of FIG. 9A, pilots are arranged such that the pilot spacing is maximized on the frequency axis and the time axis. Specifically, the pilot spacing is 3 subcarriers on the frequency axis and is 1 and 3 OFDM(A) symbols on the time axis. Accordingly, as much coherent time and coherent bandwidth can be utilized as possible, thereby improving channel estimation performance.

As shown in FIG. 9B, in the 4×6 basic unit, two 2Tx or 2 streams pilot REs are arranged for each antenna port and total pilot overhead is 16.67%. Pilot REs for the antenna port 0 are located at a subcarrier index of "0" when s=0 and at a subcarrier index of "3" when s=5. Pilot REs for the antenna port 1 are located at a subcarrier index of "3" when s=1 and at a subcarrier index of "0" when s=4. In another example, pilot REs for the antenna port 0 are located at a subcarrier index of "3" when s=0 and at a subcarrier index of "0" when s=5. Pilot REs for the antenna port 1 are located at a subcarrier index of "0" when s=1 and at a subcarrier index of "3" when s=4. The antenna ports may be switched with each other. The locations of the pilot REs can be cyclically shifted along the time axis or the frequency axis. These pilot patterns are summarized in the following tables.

TABLE 45

|        | s = 0 | s = 1 | s = 2 | s = 3 | s = 4 | s = 5 |
|--------|-------|-------|-------|-------|-------|-------|
| SC = 0 | P0    | —     | —     | —     | P1    | —     |
| SC = 1 | —     | —     | —     | —     | —     | —     |
| SC = 2 | —     | —     | —     | —     | —     | —     |
| SC = 3 | —     | P1    | —     | —     | —     | P0    |

TABLE 46

|        | s = 0 | s = 1 | s = 2 | s = 3 | s = 4 | s = 5 |
|--------|-------|-------|-------|-------|-------|-------|
| SC = 0 | —     | P1    | —     | —     | —     | P0    |
| SC = 1 | —     | —     | —     | —     | —     | —     |
| SC = 2 | —     | —     | —     | —     | —     | —     |
| SC = 3 | P0    | —     | —     | —     | P1    | —     |

In Tables 45 and 46, "P0" and "P1" indicate respective pilot REs for the antenna ports 0 and 1, "-" indicates the data RE, "s" indicates an OFDM(A) symbol index in the basic unit, and "SC" indicates a subcarrier index in the basic unit.

As shown in FIG. 9C, in the 4×6 basic unit, two 4Tx or 4 streams pilot REs are arranged for each antenna port and total pilot overhead is 33.34%. Pilot REs for the antenna port 0 are located at a subcarrier index of "0" when s=0 and at a subcarrier index of "3" when s=5. Pilot REs for the antenna port 1 are located at a subcarrier index of "3" when s=1 and at a subcarrier index of "0" when s=4. Pilot REs for the antenna port 2 are located at a subcarrier index of "3" when s=0 and at a subcarrier index of "0" when s=5. Pilot REs for the antenna port 3 are located at a subcarrier index of "0" when s=1 and at a subcarrier index of "3" when s=4. In another example, pilot REs for the antenna port 0 are located at a subcarrier index of "3" when s=0 and at a subcarrier index of "0" when s=5. Pilot REs for the antenna port 1 are located at a subcarrier index of "0" when s=1 and at a subcarrier index of "3" when s=4. Pilot REs for the antenna port 2 are located at a subcarrier index of "0" when s=0 and at a subcarrier index of "3" when s=5. Pilot REs for the antenna port 3 are located at a subcarrier index of "3" when s=1 and at a subcarrier index of "0" when s=4. The antenna ports may be switched with each other. The locations of the pilot REs can be cyclically shifted along the time axis or the frequency axis. These pilot patterns are summarized in the following tables.

TABLE 47

|        | s = 0 | s = 1 | s = 2 | s = 3 | s = 4 | s = 5 |
|--------|-------|-------|-------|-------|-------|-------|
| SC = 0 | P0    | P3    | —     | —     | P1    | P2    |
| SC = 1 | —     | —     | —     | —     | —     | —     |
| SC = 2 | —     | —     | —     | —     | —     | —     |
| SC = 3 | P2    | P1    | —     | —     | P3    | P0    |

TABLE 48

|      | s = 0 | s = 1 | s = 2 | s = 3 | s = 4 | s = 5 |
|------|-------|-------|-------|-------|-------|-------|
| SC = 0 | P2 | P1 | — | — | P3 | P0 |
| SC = 1 | — | — | — | — | — | — |
| SC = 2 | — | — | — | — | — | — |
| SC = 3 | P0 | P3 | — | — | P1 | P2 |

In Tables 47 and 48, "P0" to "P3" indicate respective pilot REs for the antenna ports 0 to 3, "-" indicates the data RE, "s" indicates an OFDM(A) symbol index in the basic unit, and "SC" indicates a subcarrier index in the basic unit.

Figure 10:
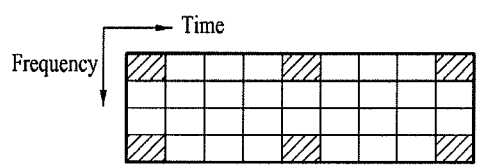
FIGS. 10-13 illustrate an example wherein 1Tx or 1 stream pilots are allocated when each basic unit includes 4 subcarriers×9 OFDM(A) symbols according to another embodiment of the present invention.

FIG. 10 illustrates an example wherein 1Tx or 1 stream pilots are allocated when each basic unit includes 4 subcarriers×9 OFDM(A) symbols according to another embodiment of the present invention. Pilots are located at both ends of each 4×9 basic unit on the frequency axis and are arranged at the same time intervals. Here, pilot overhead is 16.67%. 4×9 basic units can be consecutively allocated on the frequency axis or the time axis. Although FIG. 10 is illustrated for pilots for a single antenna, the pilot pattern of FIG. 10 can also be applied to multiple antennas in a manner similar to that illustrated in FIGS. 2 to 9.

Specifically, pilot REs are located at a subcarrier index of "0" and at a subcarrier index of "3" when s=0, at a subcarrier index of "0" and at a subcarrier index of "3" when s=4, and at a subcarrier index of "0" and at a subcarrier index of "3" when s=8. The locations of the pilot REs can be cyclically shifted along the time axis or the frequency axis. These pilot patterns are summarized in the following table.

TABLE 49

|      | s = 0 | s = 1 | s = 2 | s = 3 | s = 4 | s = 5 | s = 6 | s = 7 | s = 8 |
|------|-------|-------|-------|-------|-------|-------|-------|-------|-------|
| SC = 0 | P | — | — | — | P | — | — | — | P |
| SC = 1 | — | — | — | — | — | — | — | — | — |
| SC = 2 | — | — | — | — | — | — | — | — | — |
| SC = 3 | P | — | — | — | P | — | — | — | P |

In Table 49, "P" indicates the pilot RE, "-" indicates the data RE, "s" indicates an OFDM(A) symbol index in the basic unit, and "SC" indicates a subcarrier index in the basic unit.

Figure 11:
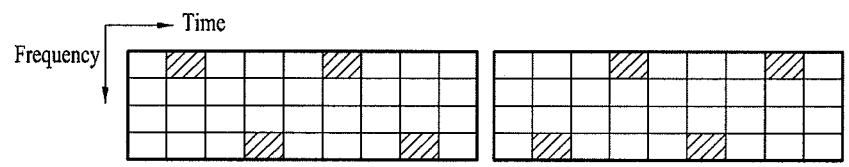

FIG. 11 illustrates an example wherein 1Tx or 1 stream pilots are allocated when each basic unit includes 4 subcarriers×9 OFDM(A) symbols according to another embodiment of the present invention. Pilot REs are designed such that they are arranged at intervals of 2 OFDM(A) symbols on the time axis so as to achieve greater robustness in the high speed case than in the low speed case. Here, pilot overhead is 11.11%. 4×9 basic units can be consecutively allocated on the frequency axis or the time axis. Although FIG. 11 is illustrated for pilots for a single antenna, the pilot pattern of FIG. 11 can also be applied to multiple antennas in a manner similar to that illustrated in FIGS. 2 to 9.

Specifically, pilot REs are located at a subcarrier index of "0" when s=1, at a subcarrier index of "3" when s=3, at a subcarrier index of "0" when s=5, and at a subcarrier index of "3" when s=7. In another example, pilot REs are located at a subcarrier index of "3" when s=1, at a subcarrier index of "0" when s=3, at a subcarrier index of "3" when s=5, and at a subcarrier index of "0" when s=7. The locations of the pilot REs can be cyclically shifted along the time axis or the frequency axis. These pilot patterns are summarized in the following table.

TABLE 50

|      | s = 0 | s = 1 | s = 2 | s = 3 | s = 4 | s = 5 | s = 6 | s = 7 | s = 8 |
|------|-------|-------|-------|-------|-------|-------|-------|-------|-------|
| SC = 0 | — | P | — | — | — | P | — | — | — |
| SC = 1 | — | — | — | — | — | — | — | — | — |
| SC = 2 | — | — | — | — | — | — | — | — | — |
| SC = 3 | — | — | — | P | — | — | — | P | — |

TABLE 51

|      | s = 0 | s = 1 | s = 2 | s = 3 | s = 4 | s = 5 | s = 6 | s = 7 | s = 8 |
|------|-------|-------|-------|-------|-------|-------|-------|-------|-------|
| SC = 0 | — | — | — | P | — | — | — | P | — |
| SC = 1 | — | — | — | — | — | — | — | — | — |
| SC = 2 | — | — | — | — | — | — | — | — | — |
| SC = 3 | — | P | — | — | — | P | — | — | — |

In Tables 50 and 51, "P" indicates the pilot RE, "-" indicates the data RE, "s" indicates an OFDM(A) symbol index in the basic unit, and "SC" indicates a subcarrier index in the basic unit.

Figure 12:
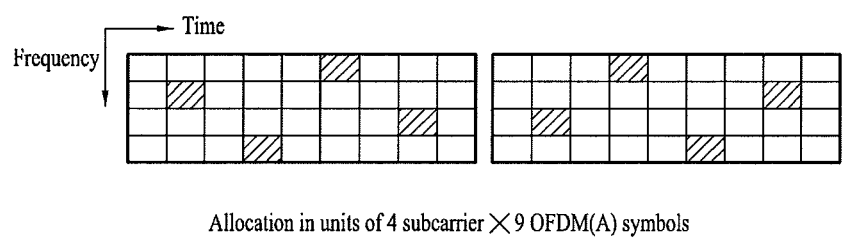

FIG. 12 illustrates an example wherein 1Tx or 1 stream pilots are allocated when each basic unit includes 4 subcarriers×9 OFDM(A) symbols according to another embodiment of the present invention. Pilot REs are designed such that they are arranged at intervals of 2 OFDM(A) symbols on the time axis so as to achieve greater robustness in the high speed case than in the low speed case. In addition, pilots are designed such that they are arranged at all positions on the frequency axis, thereby achieving greater robustness to channel delay spread. Here, pilot overhead is 11.11%. 4×9 basic units can be consecutively allocated on the frequency axis or the time axis. Although FIG. 12 is illustrated for pilots for a single antenna, the pilot pattern of FIG. 12 can also be applied to multiple antennas in a manner similar to that illustrated in FIGS. 2 to 9.

Specifically, pilot REs are located at a subcarrier index of "1" when s=1, at a subcarrier index of "3" when s=3, at a subcarrier index of "0" when s=5, and at a subcarrier index of "2" when s=7. In another example, pilot REs are located at a subcarrier index of "2" when s=1, at a subcarrier index of "0" when s=3, at a subcarrier index of "3" when s=5, and at a subcarrier index of "1" when s=7. The locations of the pilot REs can be cyclically shifted along the time axis or the frequency axis. These pilot patterns are summarized in the following table.

TABLE 52

|      | s = 0 | s = 1 | s = 2 | s = 3 | s = 4 | s = 5 | s = 6 | s = 7 | s = 8 |
|------|-------|-------|-------|-------|-------|-------|-------|-------|-------|
| SC = 0 | — | — | — | — | — | P | — | — | — |
| SC = 1 | — | P | — | — | — | — | — | — | — |
| SC = 2 | — | — | — | — | — | — | — | P | — |
| SC = 3 | — | — | — | P | — | — | — | — | — |

TABLE 53

|      | s = 0 | s = 1 | s = 2 | s = 3 | s = 4 | s = 5 | s = 6 | s = 7 | s = 8 |
|------|-------|-------|-------|-------|-------|-------|-------|-------|-------|
| SC = 0 | — | — | — | P | — | — | — | — | — |
| SC = 1 | — | — | — | — | — | — | — | P | — |
| SC = 2 | — | P | — | — | — | — | — | — | — |
| SC = 3 | — | — | — | — | — | P | — | — | — |

In Tables 52 and 53, "P" indicates the pilot RE, "-" indicates the data RE, "s" indicates an OFDM(A) symbol index in the basic unit, and "SC" indicates a subcarrier index in the basic unit.

Figure 13:
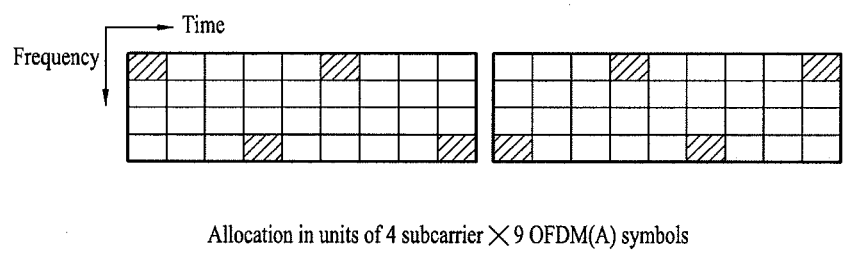

FIG. 13 illustrates an example wherein 1Tx or 1 stream pilots are allocated when each basic unit includes 4 subcarriers×9 OFDM(A) symbols according to another embodiment of the present invention. Pilot REs are designed such that they are arranged at intervals of 2 OFDM(A) symbols on the time axis so as to achieve greater robustness in the high speed case than in the low speed case. In addition, pilots are designed such that they are arranged at all positions on the frequency axis, thereby achieving greater robustness to channel delay spread. Here, pilot overhead is 11.11%. 4×9 basic units can be consecutively allocated on the frequency axis or the time axis. Although FIG. 13 is illustrated for pilots for a single antenna, the pilot pattern of FIG. 13 can also be applied to multiple antennas in a manner similar to that illustrated in FIGS. 2 to 9.

Specifically, pilot REs are located at a subcarrier index of "0" when s=0, at a subcarrier index of "3" when s=3, at a subcarrier index of "0" when s=5, and at a subcarrier index of "3" when s=8. In another example, pilot REs are located at a subcarrier index of "3" when s=0, at a subcarrier index of "0" when s=3, at a subcarrier index of "3" when s=5, and at a subcarrier index of "0" when s=8. The locations of the pilot REs can be cyclically shifted along the time axis or the frequency axis. These pilot patterns are summarized in the following table.

TABLE 54

|  | s = 0 | s = 1 | s = 2 | s = 3 | s = 4 | s = 5 | s = 6 | s = 7 | s = 8 |
|---|---|---|---|---|---|---|---|---|---|
| SC = 0 | P | — | — | — | — | P | — | — | — |
| SC = 1 | — | — | — | — | — | — | — | — | — |
| SC = 2 | — | — | — | — | — | — | — | — | — |
| SC = 3 | — | — | — | P | — | — | — | — | P |

TABLE 55

|  | s = 0 | s = 1 | s = 2 | s = 3 | s = 4 | s = 5 | s = 6 | s = 7 | s = 8 |
|---|---|---|---|---|---|---|---|---|---|
| SC = 0 | — | — | — | P | — | — | — | — | P |
| SC = 1 | — | — | — | — | — | — | — | — | — |
| SC = 2 | — | — | — | — | — | — | — | — | — |
| SC = 3 | P | — | — | — | — | P | — | — | — |

In Tables 54 and 55, "P" indicates the pilot RE, "-" indicates the data RE, "s" indicates an OFDM(A) symbol index in the basic unit, and "SC" indicates a subcarrier index in the basic unit.

In order to measure the channel estimation ability of the above pilot patterns exemplified by the present invention, comparative simulations were carried out in case of one stream and two streams transmissions.

The pilot pattern used in the comparative simulation are shown in the following table:

TABLE 56

| One stream case ||| Two streams case |||
|---|---|---|---|---|---|
| Option | Pattern | Pilot OH | Option | Pattern | Pilot OH |
| 1-1 | [pattern] | 16.7% | 2-1 | [pattern] | 16.7% |
| 1-2 | [pattern] | 16.7% | 2-2 | [pattern] | 25% |
| 1-3 | [pattern] | 16.7% | 2-3 | [pattern] | 33% |

In Table 56, the numbers "1" and "2" in the pilot patterns indicate pilot REs for a first stream and a second stream, which correspond to the "P0" and "P1" respectively. The pilot patterns 1-1 and 1-2 correspond to the pilot patterns of FIG. 8A (Table 40) and FIG. 9A (Table 43) respectively. The pilot pattern 1-3 corresponds to two consecutively arranged pilot pattern of FIG. 3A (Table 7) in time domain. The pilot pattern 2-1 corresponds to the pilot patterns of FIG. 8B (Table 41). The pilot patterns 2-2 and 2-3 are pilot patterns specified for comparative purpose.

Figure 14A:
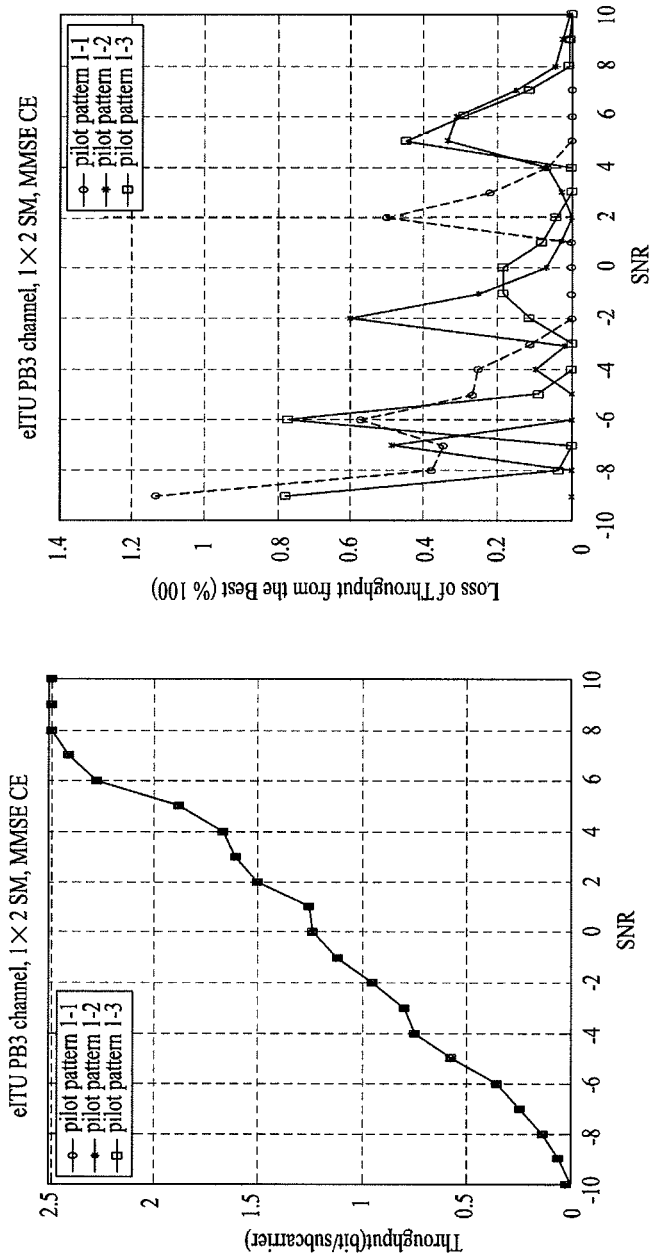
FIGS. 14A-14C illustrates simulation results on channel estimation in case of one stream transmission.
Figure 14B:
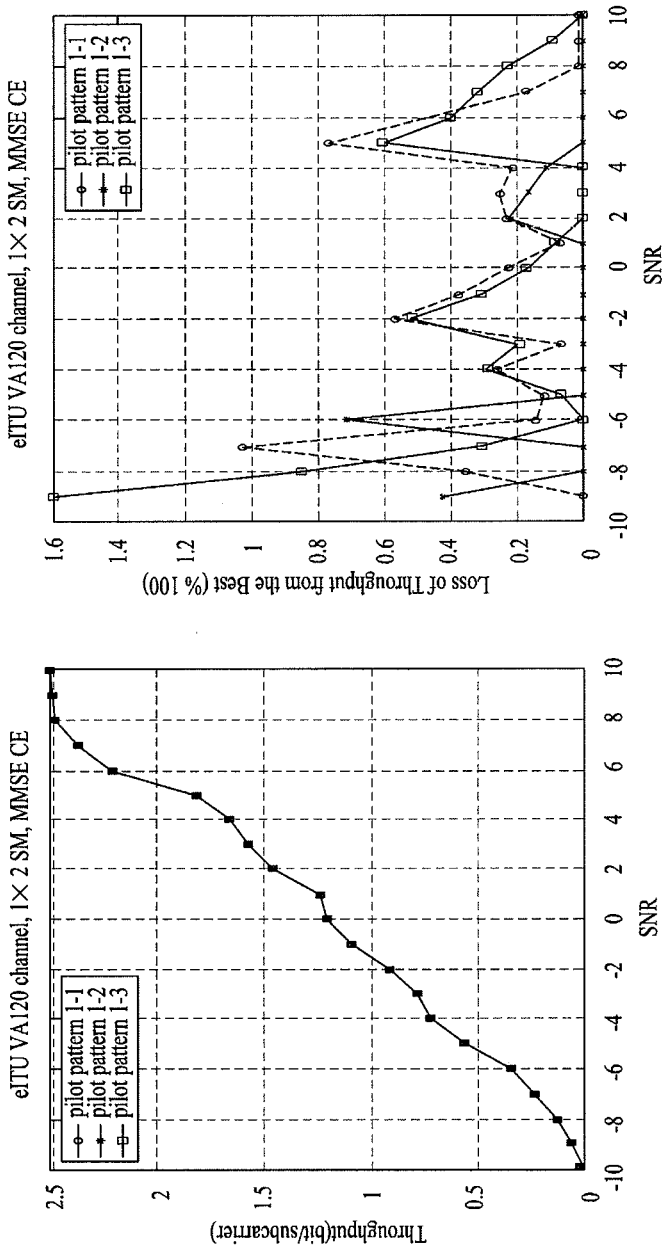

The simulation parameters are as follows:
Channel estimation: Two-dimensional Minimum Mean Square Error (2D MMSE) Channel Estimation
Receiver: 2 Rx MMSE receiver
Channel Model: eITU PedB3 km/h, VehA120 km/h, VehA350 km/h Channel
Tx antenna spacing: 4 lambda
Rx antenna spacing: 0.5 lambda
Pilot boosting: 3 dB
Noise-limited FIGS. 14A-14C illustrates simulation results on channel estimation in case of one stream transmission.

In, PedB (Pedestrian B) 3 km/h, the three pilot patterns 1-1, 1-2 and 1-3 show similar link throughput performance. The pilot pattern 1-2 shows the least degradation in relative throughput loss performance (FIG. 14A).

In VehA (Vehicular A) 120 km/h, the three pilot patterns 1-1, 1-2 and 1-3 show similar link throughput performance. The pilot pattern 1-2 clearly outperforms the others in relative throughput loss performance (FIG. 14B).

Figure 14C:
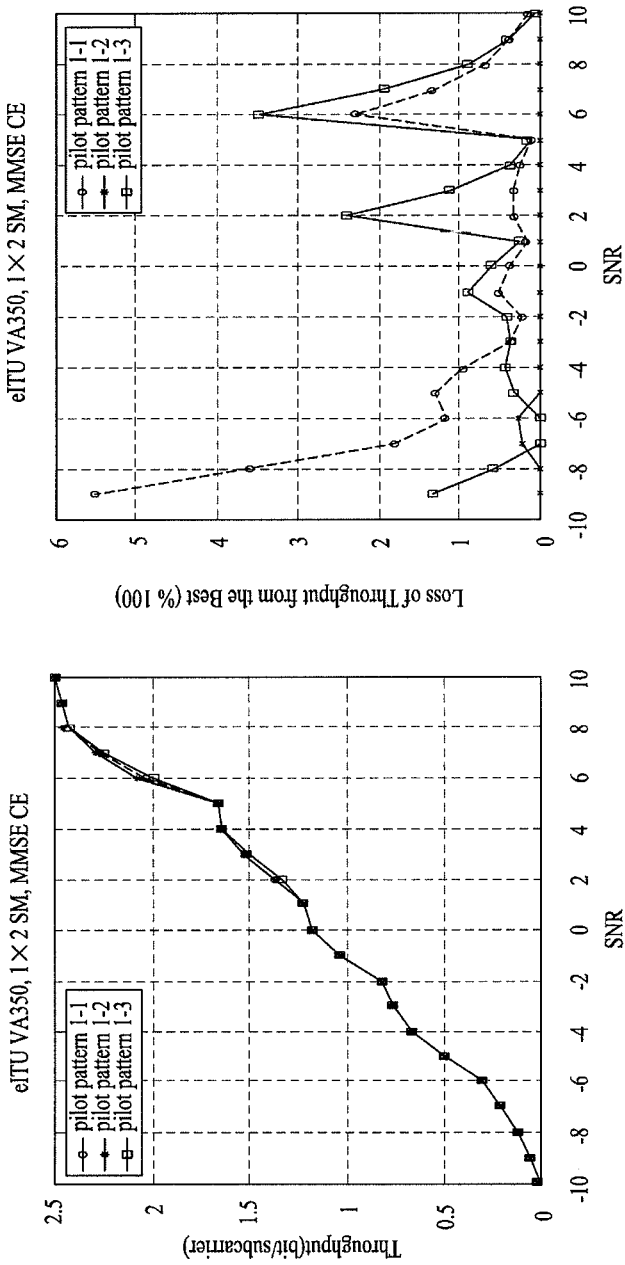

In VehA 350 km/h, the pilot pattern 1-2 clearly outperforms the others in both link throughput performance and relative throughput loss performance (FIG. 14C).

Figure 15A:
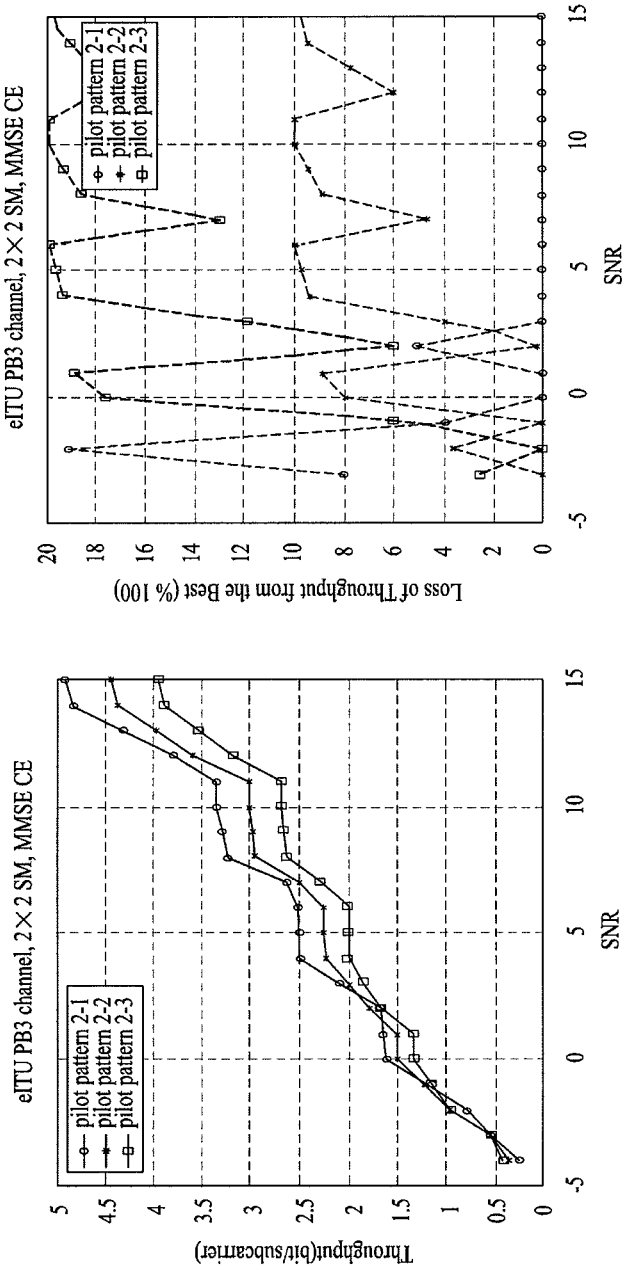
FIGS. 15A-15C illustrates simulation results on channel estimation in case of two streams transmission.
Figure 15B:
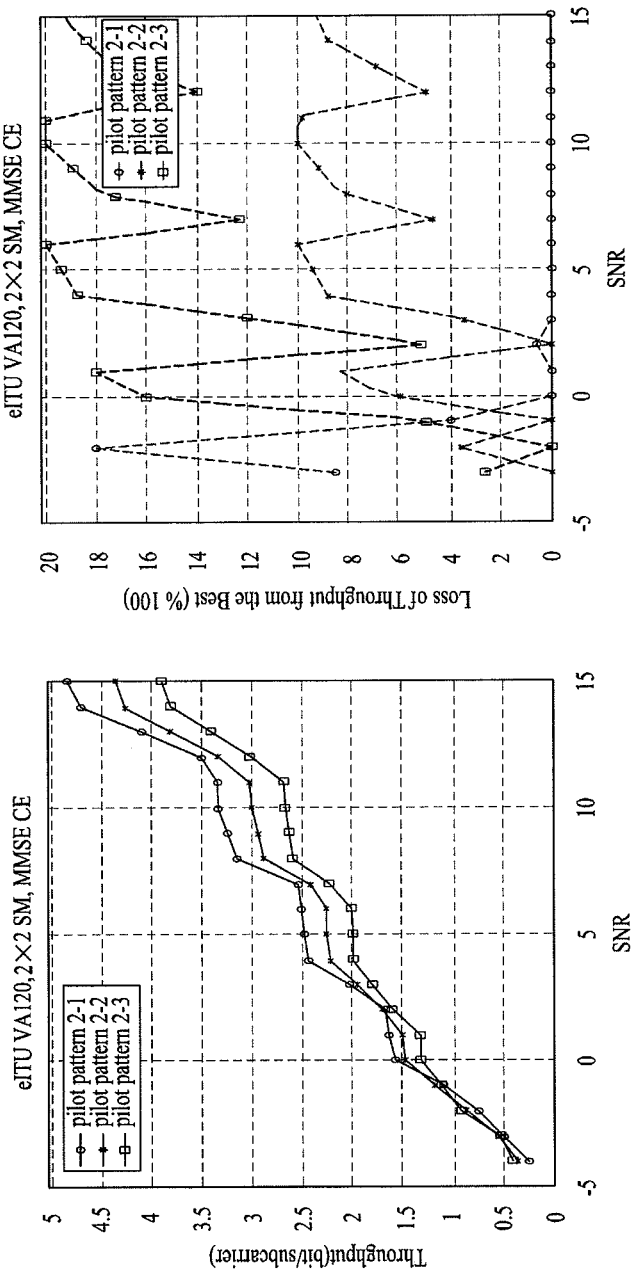
Figure 15C:
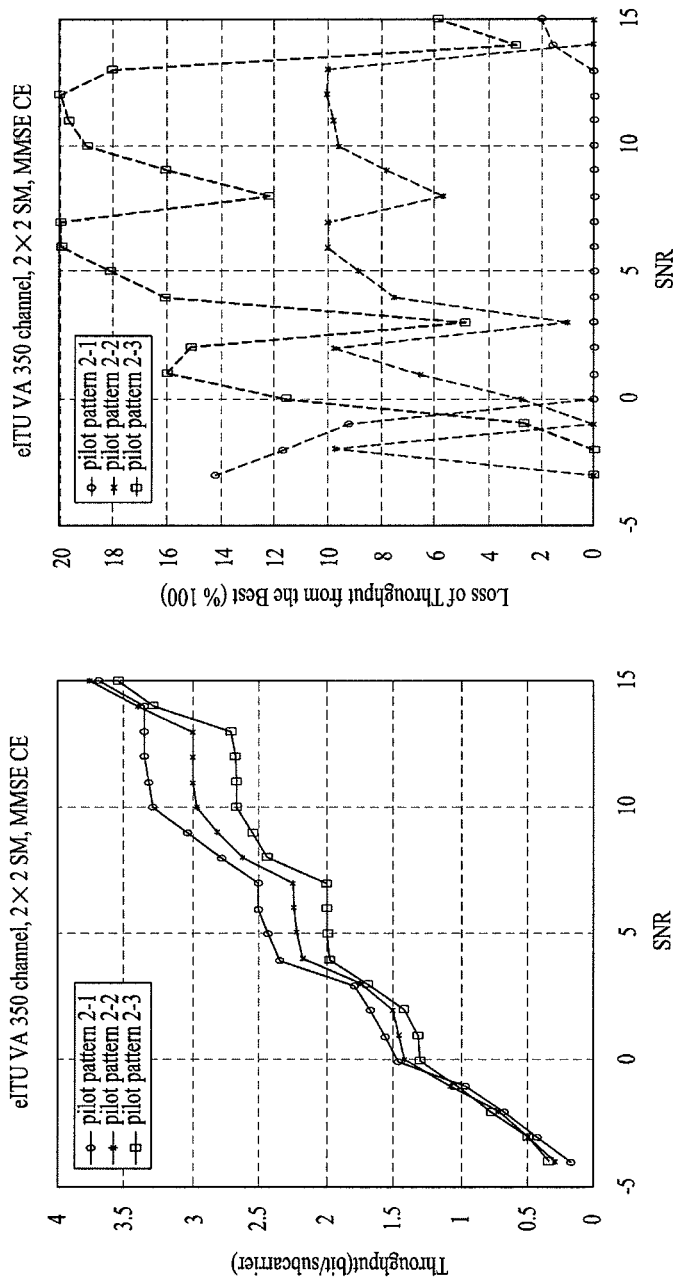

FIGS. 15A-15C illustrates simulation results on channel estimation in case of two streams transmission.

In all the conditions PedB 3 km/h, VehA 120 km/h and VehA 350 km/h, the pilot pattern 2-1 clearly outperforms the others in both link throughput performance and relative throughput loss performance (FIGS. 15A-15C).

Figure 16:
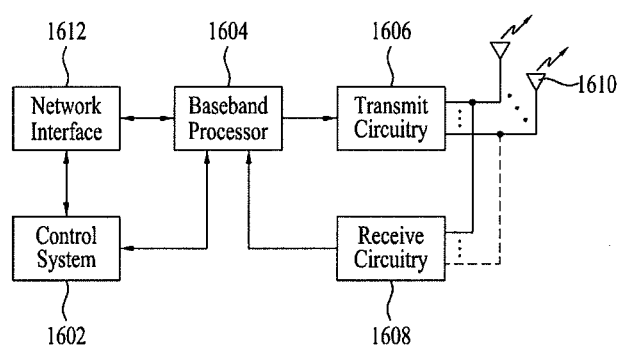
FIG. 16 is a block diagram of a base station that can be applied to an embodiment of the present invention.

FIG. 16 is a block diagram of a base station that can be applied to an embodiment of the present invention.

As shown in FIG. 16, the base station generally includes a control system 1602, a baseband processor 1604, transmit circuitry 1606, receive circuitry 1608, multiple antennas 1610, and a network interface 1612. The receive circuitry 1608 receives a radio signal transmitted from a terminal through the multiple antennas 1610. Preferably, a low-noise amplifier and a filter (not shown) amplify the received signal and remove broadband interference from the signal. Down-conversion and digitization circuitry (not shown) downconverts the filtered signal to an intermediate or baseband frequency signal and then digitizes the downconverted signal into one or more digital streams.

The baseband processor 1604 processes the digital received signal to extract information or data bits from the received signal. This processing includes demodulation, decoding, error correction, or the like. The baseband processor 1604 generally includes one or more Digital Signal Processors (DSPs). Thereafter, the received information is transmitted through a wireless network via a network interface or is transmitted to another terminal served by the base station. The network interface 1612 interacts with a circuit switched network that forms a part of a wireless network that can be connected to a Public Switched Telephone Network (PSTN) and a central network controller.

On the transmitting side, the baseband processor 1604 receives digital data, which can represent voice, data, or control information, from the network interface 1612, and encodes the data for transmission under control of the control system 1602. The encoded data is input to the transmit circuitry 1606. The transmit circuitry 1606 modulates the encoded data using a carrier having a desired transmission frequency(s). The amplifier (not shown) amplifies the modulated carrier signal to a level suitable for transmission. The amplified signal is transmitted to the multiple antennas 1610.

Figure 17:
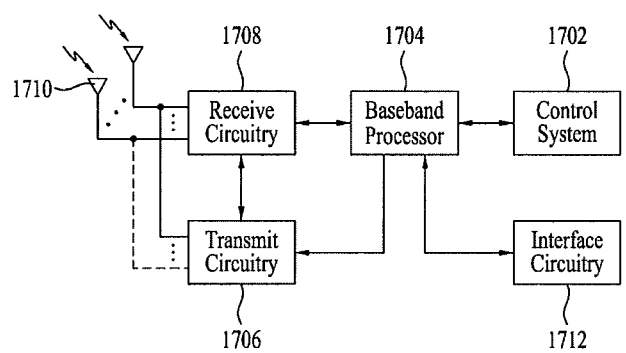
FIG. 17 is a block diagram of a terminal that can be applied to an embodiment of the present invention.

FIG. 17 is a block diagram of a terminal that can be applied to an embodiment of the present invention.

As shown in FIG. 17, the terminal may include a control system 1702, a baseband processor 1704, transmit circuitry 1706, receive circuitry 1708, multiple antennas 1710, and user interface circuitry 1712. The receive circuitry 1708 receives a radio signal including information from one or more base stations through the multiple antennas 1710. Preferably, a low-noise amplifier and a filter (not shown) amplify the received signal and remove broadband interference from the signal. Thereafter, downconversion and digitization circuitry (not shown) downconverts the filtered signal to an intermediate or baseband frequency signal and then digitizes the downconverted signal into one or more digital streams. The baseband processor 1704 processes the digital received signal to extract information or data bits from the received signal. This processing includes operations such as demodulation, decoding, and error correction. The baseband processor 1704 generally includes one or more Digital Signal Processors (DSPs) and Application Specific Integrated Circuits (ASICs).

On the transmitting side, the baseband processor 1704 receives digital data, which can represent voice, data, or control information, from the user interface circuitry 1712, and encodes the data for transmission under control of the control system 1702. The encoded data is input to the transmit circuitry 1706. The transmit circuitry 1706 modulates the encoded data using a carrier having a desired transmission frequency(s). The amplifier (not shown) amplifies the modulated carrier signal to a level suitable for transmission. The amplified signal is transmitted to the multiple antennas 1710.

Figure 18:
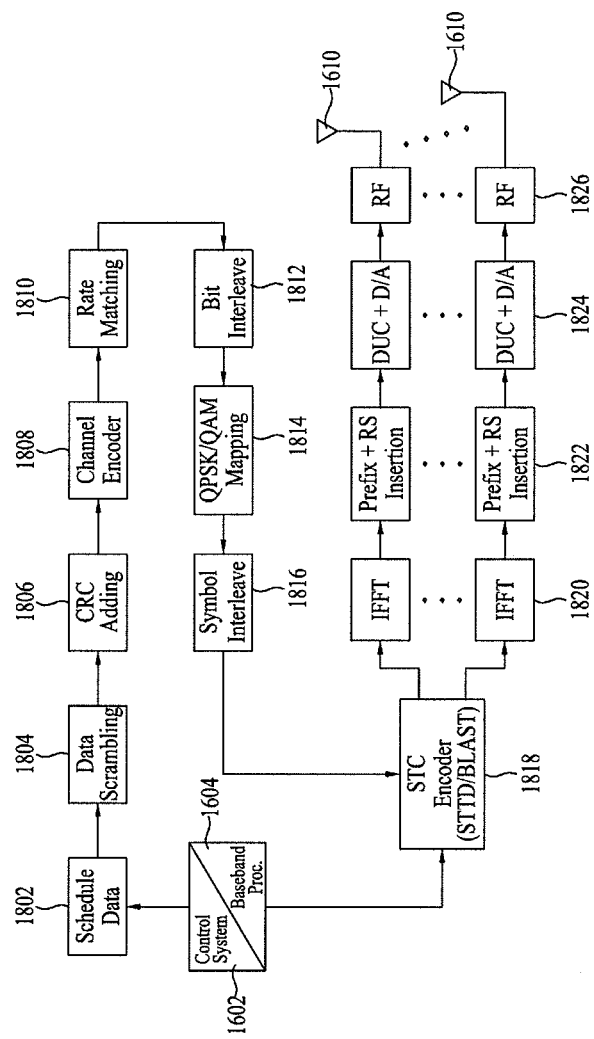
FIG. 18 illustrates a block diagram of a transmitter that can be applied to an embodiment of the present invention.

FIG. 18 illustrates a block diagram of a transmitter that can be applied to an embodiment of the present invention.

Although the structure of the transmitter of FIG. 18 will be described with reference to a base station, it will be appreciated by those skilled in the art that the illustrated structure can be used for both uplink and downlink transmission. The illustrated transmission structure is intended to represent, without being limited to, a variety of multiple access structures including Code Division Multiple Access (CDMA), Frequency Division Multiple Access (FDMA), and Orthogonal Frequency Division Multiplexing (OFDM).

Initially, the network transmits data for transmission to a terminal to the base station. In the base station, a data scrambling module 1804 scrambles scheduled data, which is a bitstream, in a manner reducing a peak to average power ratio associated with data. A CRC adding module 1806 then determines and adds a Cyclic Redundancy Check (CRC) checksum for the scrambled data to the scrambled data. Then, a channel encoder module 1808 performs channel coding on the data to allow the terminal to perform recovery and error correction of the data. The channel coding enables efficient addition of redundancy to the data. The channel encoder module 1808 can use turbo encoding technologies.

Then, a mapping module 1814 systematically maps the processed data bits to a corresponding symbol based on a selected baseband modulation mode. Here, a Quadrature Amplitude Modulation (QAM) or Quadrature Phase-Shift Keying (QPSK) modulation mode can be used. A bit group is mapped to a symbol representing a position in the amplitude-phase constellation. Then, a Space-Time Code (STC) encoder module 1818 processes the symbol block. Specifically, the STC encoder module 1818 processes the symbol according to a selected STC encoding mode and provides the same number of N outputs as the number of the multiple antennas 1610 of the base station. Each of a plurality of IFFT processing modules 1820 inverse Fourier-transforms a symbol stream output from the STC encoder module 1818. Then, each of a plurality of prefix and RS insertion modules 1822 inserts a Cyclic Prefix (CP) and an RS to the inverse Fourier-transformed signal. Although RS is exemplified to be inserted after IFFT has been carried out, RS may be also inserted before IFFT. In this case, separate RS insertion module may be added before IFFT processing modules 1820. Then, each of a plurality of digital upconversion (DUC) and digital to analog (D/A) conversion modules 1824 upconverts the processed signal from the prefix and RS insertion module 1822 to an intermediate frequency in the digital domain and then converts the upconverted signal into an analog signal. Then, analog signals created in this manner are simultaneously modulated, amplified, and transmitted through a plurality of RF modules 1826 and the multiple antennas 1610.

Figure 19:
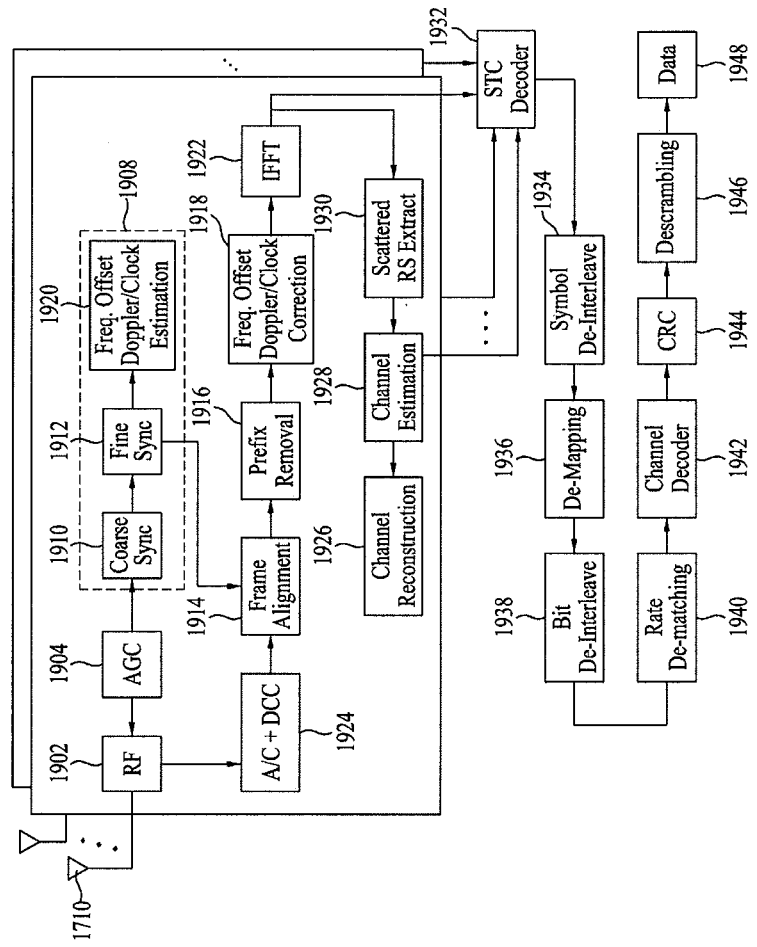
FIG. 19 is a block diagram of a receiver that can be applied to an embodiment of the present invention.

FIG. 19 is a block diagram of a receiver that can be applied to an embodiment of the present invention.

Although the structure of the receiver of FIG. 19 will be described with reference to a terminal, it will be appreciated by those skilled in the art that the illustrated structure can be used for both uplink and downlink transmission. When a transmission signal is received by multiple antennas 1710, each signal is demodulated and amplified through a corresponding RF module 1902. For the sake of convenience, only one of multiple reception paths is illustrated in FIG. 19. An analog to digital (A/D) conversion and digital downconversion module (DCC) 1904 then converts the analog signal into a digital signal for digital processing and downconverts the digital signal. The digital signal can be provided to and used in an Automatic Gain Control (AGC) module 1906 in order to control amplifier gain of the RF module 1902 based on the received signal level.

The digital signal is also provided to a synchronization module 1908. The synchronization module 1908 may include a coarse sync module 1910 that performs coarse synchronization, a fine sync module 1912 that performs fine synchronization, and a frequency offset Doppler/Clock estimation module that estimates a frequency offset or a Doppler effects value. A signal output from the synchronization module 1908 is provided to a frame alignment module 1914 and a frequency offset Doppler/Clock correction module 1918. A prefix removal module 1916 removes a CP from the aligned frame. Then, an FFT module 1922 Fourier-transforms the CP-removed data. Then, an RS extraction module 1930 extracts an RS signal spread in the frame and provides the RS signal to a channel estimation module 1928. Then, a channel reconstruction module 1926 reconstructs a radio channel using the channel estimation result. The channel estimation provides sufficient channel response information to enable an STC decoder 1932 to decode the symbol according to an STC encoding method used in the base station and to restore an estimation corresponding to transmission bits. The symbol obtained from the received signal and the channel estimation result of each reception path are provided to the STC decoder 1932. The STC decoder 1932 then performs STC decoding on each reception path to restore the obtained symbol. The STC decoder 1932 can implement maximum likelihood decoding (MLD) for blast-based transmission. The output of the STC decoder 1932 may be a Log-Likelihood Ratio (LLR) for each transmission bit. A symbol de-interleaver module 1934 then arranges STC-decoded symbols in the original order. Then, a de-mapping module 1936 de-maps the symbols into a bitstream and a bit de-interleaver module 1938 de-interleaves the bitstream. A rate de-matching module 1940 then processes and provides the de-interleaved bitstream to a channel decoder module 1942 to restore scrambled data and a CRC checksum. Here, the channel decoder module 1942 may use turbo decoding. A CRC module 1944 then removes the CRC checksum and checks the scrambled data according to a conventional method. A de-scrambling module 1946 then reconstructs the CRC-checked data into original data 1948.

The above embodiments are provided by combining components and features of the present invention in specific forms. The components or features of the present invention should be considered optional if not explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention have been described focusing mainly on the data communication relationship between a mobile station (MS) and a Base Station (BS). Specific operations which have been described as being performed by the BS may also be performed by an upper node as needed. That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", or "access point". The term "mobile station (MS)" may also be replaced with another term such as "user equipment (UE)", "terminal", or "mobile subscriber station (MSS)".

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

As is apparent from the above description, the present invention provides a basic unit and a pilot structure that can reduce pilot overhead in uplink and can also guarantee excellent channel estimation. The basic unit and the pilot structure according to the present invention reduce pilot overhead of an OFDM(A) system, thereby improving system performance, and keeps uniform time/frequency spacings, thereby guaranteeing channel estimation performance, and can be applied to a base station, a terminal, or the like which are compatible with IEEE 802.16m.

What is claimed is:

1. An apparatus used for an Orthogonal Frequency Division Multiple Access (OFDMA) wireless communication system, the apparatus comprising:

multiple antennas for transmitting one or more basic units, wherein each basic unit includes four subcarriers by six OFDMA symbols and contains a plurality of pilot and data resource elements (REs); and a processor for configuring the basic units, wherein, for a single-stream transmission, the pilot and data REs are configured in the basic unit as shown in Table 1, which configures the pilot REs in the basic unit at intervals of 3 subcarriers in a frequency axis and at intervals of 1 or 4 OFDMA symbols in a time axis, and wherein, for two-stream transmission, the pilot and data REs are configured in the basic unit as shown in Table 2, which configures the pilot REs in the basic unit at intervals of 3 subcarriers in a frequency axis and at intervals of 5 OFDMA symbols in a time axis:

TABLE 1

| Basic unit | 6 OFDMA symbols | | | | | |
|---|---|---|---|---|---|---|
| 4 contiguous subcarriers | P | — | — | — | P | — |
| | — | — | — | — | — | — |
| | — | — | — | — | — | — |
| | — | P | — | — | — | P |

TABLE 2

| Basic unit | 6 OFDMA symbols | | | | | |
|---|---|---|---|---|---|---|
| 4 contiguous subcarriers | Pa | — | — | — | — | Pb |
|  | — | — | — | — | — | — |
|  | — | — | — | — | — | — |
|  | Pb | — | — | — | — | Pa | where "P" indicates a pilot RE for the single stream, "Pa" indicates a pilot RE for a first stream, "Pb" indicates a pilot RE for a second stream, and "-" indicates a data RE.

2. The apparatus of claim 1, wherein each RE is a time-frequency resource of one subcarrier by one OFDMA symbol.

3. The apparatus of claim 1, wherein each basic unit is an uplink partial usage of subchannel (PUSC) tile.

4. The apparatus of claim 1, wherein a certain number of basic units form a larger resource unit.

5. The apparatus of claim 4, wherein the basic units forming the larger resource unit are contiguous in the frequency domain.

6. The apparatus of claim 4, wherein the basic units forming the larger resource unit are distributed in the frequency domain.

7. The apparatus of claim 1, wherein the pilot REs for the first stream and the pilot REs for the second stream are switched between each other.

8. The apparatus of claim 1, wherein locations of the pilot REs are cyclically shifted in the frequency domain or in the time domain.

9. The apparatus of claim 1, wherein the Pilot REs are power boosted with a power of data REs in a common OFDMA symbol.

10. The apparatus of claim 1, wherein pilot and data symbols are mapped to corresponding pilot and data REs, respectively.

11. The apparatus of claim 1, wherein the pilot REs are used for a dedicated pilot.

12. The apparatus of claim 1, wherein a transmit diversity scheme is independently applied to each basic unit.

13. The apparatus of claim 12, wherein the transmit diversity scheme includes space time block code (STBC), space frequency block code (SFBC), cyclic delay diversity (CDD) or any combination thereof.

* * * * *